US012508980B2

(12) United States Patent
Shimotani et al.

(10) Patent No.: US 12,508,980 B2
(45) Date of Patent: Dec. 30, 2025

(54) DRIVING ASSISTANCE APPARATUS AND DRIVING ASSISTANCE METHOD

(71) Applicant: Mitsubishi Electric Corporation, Tokyo (JP)

(72) Inventors: Mitsuo Shimotani, Tokyo (JP); Yasushi Kodaka, Tokyo (JP); Takahiro Ono, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 74 days.

(21) Appl. No.: 18/697,589

(22) PCT Filed: Dec. 28, 2021

(86) PCT No.: PCT/JP2021/048769
§ 371 (c)(1),
(2) Date: Apr. 1, 2024

(87) PCT Pub. No.: WO2023/127087
PCT Pub. Date: Jul. 6, 2023

(65) Prior Publication Data
US 2024/0409025 A1    Dec. 12, 2024

(51) Int. Cl.
*B60Q 1/08* (2006.01)
(52) U.S. Cl.
CPC ........ *B60Q 1/085* (2013.01); *B60Q 2300/324* (2013.01); *B60Q 2300/335* (2013.01)
(58) Field of Classification Search
CPC ............. B60Q 1/085; B60Q 2300/324; B60Q 2300/335; B60Q 2300/33; B60Q 2300/336; B60Q 1/143
See application file for complete search history.

(56) References Cited

U.S. PATENT DOCUMENTS

| 2003/0031008 | A1  |  2/2003 | Kobayashi |
| 2008/0239698 | A1* | 10/2008 | Ibrahim ............ B60Q 1/12 |
|              |     |         |                        362/37 |
| 2020/0063938 | A1  |  2/2020 | Kurashige et al. |

FOREIGN PATENT DOCUMENTS

| JP | 2002193026 A | * | 7/2002 |
| JP | 2003-48481 A |   | 2/2003 |

(Continued)

OTHER PUBLICATIONS

International Search Report (PCT/ISA/210) issued in PCT/JP2021/048769, dated Mar. 1, 2022.

(Continued)

*Primary Examiner* — Lindsay M Low
*Assistant Examiner* — Charles J Brauch
(74) *Attorney, Agent, or Firm* — Birch, Stewart, Kolasch & Birch, LLP

(57) ABSTRACT

It is an object to provide technology allowing for appropriate control of a lighting apparatus to illuminate a road from a vehicle. An acquisition unit acquires position information of the vehicle, travel lane information indicating a travel lane in which the vehicle is traveling, and road information. A controller performs control to cause the lighting apparatus to illuminate a branching road directly connected to the travel lane in a first illumination manner when it is determined, based on the position information, the travel lane information, and the road information, that there is the branching road and the vehicle is traveling a first illumination section satisfying a predetermined positional relationship with a branching point of the branching road from the travel lane.

19 Claims, 30 Drawing Sheets

(56) References Cited

FOREIGN PATENT DOCUMENTS

| | | | | |
|---|---|---|---|---|
| JP | 2006248246 | A | * | 9/2006 |
| JP | 2007296918 | A | * | 11/2007 |
| JP | 2010105580 | A | * | 5/2010 |
| JP | 2020-15328 | A | | 1/2020 |
| JP | 2020015328 | A | * | 1/2020 |
| JP | 2021-192110 | A | | 12/2021 |

OTHER PUBLICATIONS

Japanese Office Action for Japanese Application No. 2023-570569, dated Aug. 27, 2024, with English translation.

* cited by examiner

DRIVING ASSISTANCE APPARATUS AND DRIVING ASSISTANCE METHOD

TECHNICAL FIELD

The present disclosure relates to driving assistance apparatuses and driving assistance methods.

BACKGROUND ART

Technology of performing control to swivel headlamps to direct illumination by the headlamps to a branching road when a travel lane in which a vehicle is traveling is connected to the branching road and not performing the control when the travel lane is not connected to the branching road has been proposed (e.g., Patent Document 1). According to such technology, a driver can easily recognize the presence of the branching road.

PRIOR ART DOCUMENTS

Patent Document

Patent Document 1: Japanese Patent Application Laid-Open No. 2010-105580

SUMMARY

Problem to be Solved by the Invention

In the above-mentioned technology, it is necessary to reduce a swiveling angle to perform swiveling so that the vehicle illuminates the branching road at a point away from a branching point. Reduction in swiveling angle, however, causes a problem in that the driver cannot be aware of swiveling of the headlamps and cannot recognize the presence of the branching road. Reduction in swiveling angle also causes a problem in that the driver cannot know the shape of the branching road as a portion of the branching road farther than the branching point cannot be illuminated.

On the other hand, it is necessary to increase the swiveling angle to perform swiveling so that the vehicle illuminates a wide range of the branching road at a point close to the branching point. An increase in swiveling angle, however, causes a problem in that the headlamps can illuminate the branching road but cannot illuminate a road ahead of the vehicle.

The present disclosure has been conceived in view of problems as described above, and it is an object of the present disclosure to provide technology allowing for appropriate control of a lighting apparatus to illuminate a road from a vehicle.

Means to Solve the Problem

A driving assistance apparatus according to the present disclosure is a driving assistance apparatus that controls a lighting apparatus to illuminate a road from a vehicle and includes: an acquisition unit that acquires position information of the vehicle, travel lane information indicating a travel lane in which the vehicle is traveling, and road information; and a controller that performs control to cause the lighting apparatus to illuminate a branching road directly connected to the travel lane in a first illumination manner when it is determined, based on the position information, the travel lane information, and the road information, that there is the branching road and the vehicle is traveling a first illumination section satisfying a predetermined positional relationship with a branching point of the branching road from the travel lane.

Effects of the Invention

According to the present disclosure, control to cause the lighting apparatus to illuminate the branching road directly connected to the travel lane in the first illumination manner is performed when it is determined that there is the branching road and the vehicle is traveling the first illumination section. According to such a configuration, the lighting apparatus to illuminate the road from the vehicle can appropriately be controlled.

These and other objects, features, aspects and advantages of the present disclosure will become more apparent from the following detailed description when taken in conjunction with the accompanying drawings.

DESCRIPTION OF EMBODIMENTS

Embodiment 1

Figure 1:
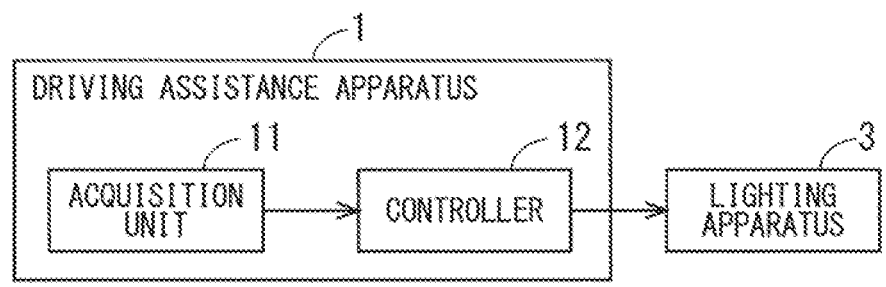
FIG. 1 is a block diagram showing a configuration of a driving assistance apparatus according to Embodiment 1.

FIG. 1 is a block diagram showing a configuration of a driving assistance apparatus 1 according to Embodiment 1. The driving assistance apparatus 1 in FIG. 1 includes an acquisition unit 11 and a controller 12 and controls a lighting apparatus 3 to illuminate a road from a vehicle. The lighting apparatus 3 may include a headlamp of the vehicle or a sub-lamp of the vehicle or may include both of them. The sub-lamp is a secondary lighting apparatus, such as a small lamp and a fog lamp, to perform assistive illumination. The road may include only one lane or may include a plurality of lanes.

The acquisition unit 11 acquires position information of the vehicle. For this function of the acquisition unit 11, an apparatus to detect the position information of the vehicle based on a signal from a satellite, such as a global positioning system (GPS), may be used, an image processing apparatus to recognize the position information of the vehicle based on an image of surroundings of the vehicle may be used, or an interface of each of these apparatuses may be used.

The acquisition unit 11 acquires travel lane information indicating a travel lane in which the vehicle is traveling. For this function of the acquisition unit 11, a high-precision locator apparatus using a high-precision map, for example, may be used, the image processing apparatus to recognize the position information of the vehicle based on the image of surroundings of the vehicle may be used, or an interface of each of these apparatuses may be used.

The acquisition unit 11 acquires road information. The road information includes information indicating a connection relationship between roads. For the function of acquiring the road information of the acquisition unit 11, an interface to acquire the road information from a storage apparatus of the vehicle may be used, a communication apparatus to receive the road information from a server external to the vehicle may be used, or an interface of the communication apparatus may be used.

The controller 12 determines, based on the position information, the travel lane information, and the road information acquired by the acquisition unit 11, whether there is a branching road directly connected to the travel lane and whether the vehicle is traveling a first illumination section. One example of determination will be described below.

First, the controller 12 determines, based on the travel lane information and the road information, whether there is the branching road directly connected to the travel lane in which the vehicle is traveling. The branching road directly connected to the travel lane is a branching road connected to the travel lane with no lane interposed therebetween.

When it is determined that there is the branching road directly connected to the travel lane, the controller 12 determines, based on the branching road and the position information, whether the vehicle is traveling the first illumination section. The first illumination section is a section satisfying a predetermined positional relationship with a branching point of the branching road from the travel lane. The predetermined positional relationship may include a road between the branching point and a point a predetermined distance away from the branching point toward the vehicle, for example, or may include another positional relationship.

When it is determined, as a result of determination described above, that there is the branching road directly connected to the travel lane and the vehicle is traveling the first illumination section, the controller 12 performs control to cause the lighting apparatus 3 to illuminate the branching road in a first illumination manner.

Summary of Embodiment 1

According to the driving assistance apparatus 1 according to Embodiment 1 as described above, control to cause the lighting apparatus 3 to illuminate the branching road directly connected to the travel lane in the first illumination manner is performed when it is determined that there is the branching road and the vehicle is traveling the first illumination section. According to such a configuration, control to cause the lighting apparatus 3 to illuminate the branching road can be performed in a section in which the vehicle is an appropriate distance away from the branching point, so that an appropriate angle can be used as a swiveling angle of the lighting apparatus 3. As a result, an appropriate balance between illumination of the travel lane ahead of the vehicle and illumination of a wide range of the branching road can be maintained to appropriately control the lighting apparatus 3.

Embodiment 2

Figure 2:
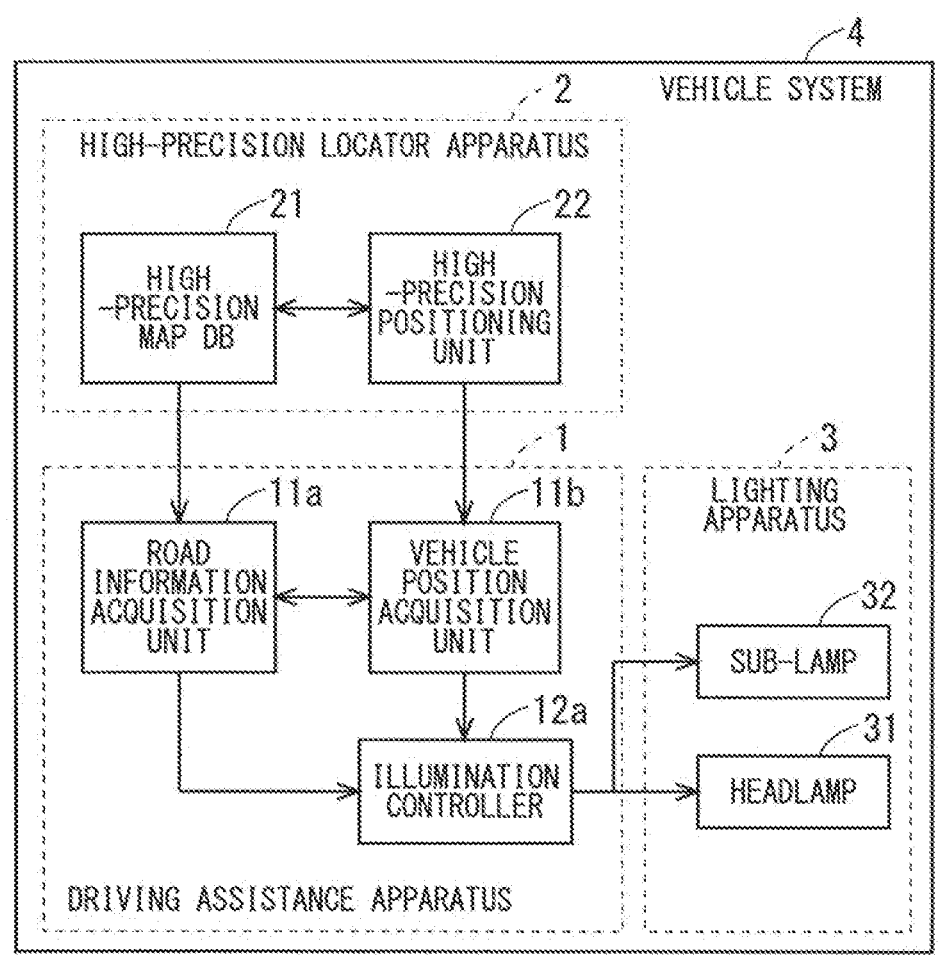
FIG. 2 is a block diagram showing a configuration of a driving assistance apparatus according to Embodiment 2.

FIG. 2 is a block diagram showing a configuration of a driving assistance apparatus 1 according to Embodiment 2. From among components according to Embodiment 2, the same components as or similar components to the above-mentioned components bear the same reference signs as or similar reference signs to those of the same or similar components, and different components will mainly be described below.

The driving assistance apparatus 1 in FIG. 2 is included in a vehicle system 4. The vehicle system 4 includes not only the driving assistance apparatus 1 but also a high-precision locator apparatus 2 and the lighting apparatus 3.

The high-precision locator apparatus 2 includes a high-precision map database (DB) 21 and a high-precision positioning unit 22. The high-precision map DB 21 stores the road information for each lane. The road information may include not only a connection relationship between roads and lanes but also a planar shape, a grade, and a type of each of the roads and the lanes and an angle between lanes, roads, and the like at a connection point. The high-precision positioning unit 22 detects the position information of the vehicle for each lane and the travel lane information of the vehicle for each lane based on the road information stored in the high-precision map DB 21 and the signal from the satellite, such as the GPS.

The lighting apparatus 3 is similar to the lighting apparatus 3 described in Embodiment 1 and includes a headlamp 31 and a sub-lamp 32. In Embodiment 2, the sub-lamp 32 can freely change a direction, a width, and the like of an illumination range. The sub-lamp 32 can control the direction and the width of the illumination range by controlling an illumination direction of a light source of the sub-lamp 32 toward a reflective plate of the sub-lamp 32, for example. The sub-lamp 32 may be capable of illuminating a road with at least any of characters, graphics, or signs.

The driving assistance apparatus 1 includes a road information acquisition unit 11a, a vehicle position acquisition unit 11b, and an illumination controller 12a. The road information acquisition unit 11a and the vehicle position acquisition unit 11b are included in a concept of the acquisition unit 11 in FIG. 1, and the illumination controller 12a is included in a concept of the controller 12 in FIG. 1.

The road information acquisition unit 11a acquires the road information from the high-precision map DB 21 of the high-precision locator apparatus 2. The vehicle position acquisition unit 11b acquires the position information and the travel lane information from the high-precision positioning unit 22 of the high-precision locator apparatus 2.

The illumination controller 12a has a similar function to the controller 12 according to Embodiment 1. The illumination controller 12a determines whether there is the branching road directly connected to the travel lane and whether the vehicle is traveling the first illumination section based on the position information and the travel lane information acquired by the vehicle position acquisition unit 11b and the road information acquired by the road information acquisition unit 11a.

The first illumination section is a section of the travel lane between the branching point of the branching road from the travel lane and the point the predetermined distance (e.g., 100 m) away from the branching point toward the vehicle, for example. The first illumination section may be changed depending on the shape of the travel lane, the shape of the branching road, a travel speed of the vehicle, and the like. For example, when the travel lane has a large road curvature, it is difficult to look ahead of the vehicle, and thus the first illumination section may be changed so that the predetermined distance of the first illumination section is greater than 100 m. The first illumination section may also be changed so that, as the travel speed of the vehicle increases, the predetermined distance of the first illumination section increases, that is, illumination in the first illumination manner is performed earlier, for example.

When it is determined, as a result of determination described above, that there is the branching road directly connected to the travel lane and the vehicle is traveling the first illumination section, the illumination controller 12a performs control to cause the sub-lamp 32 to illuminate the branching road in the first illumination manner.

Operation

Figure 3:
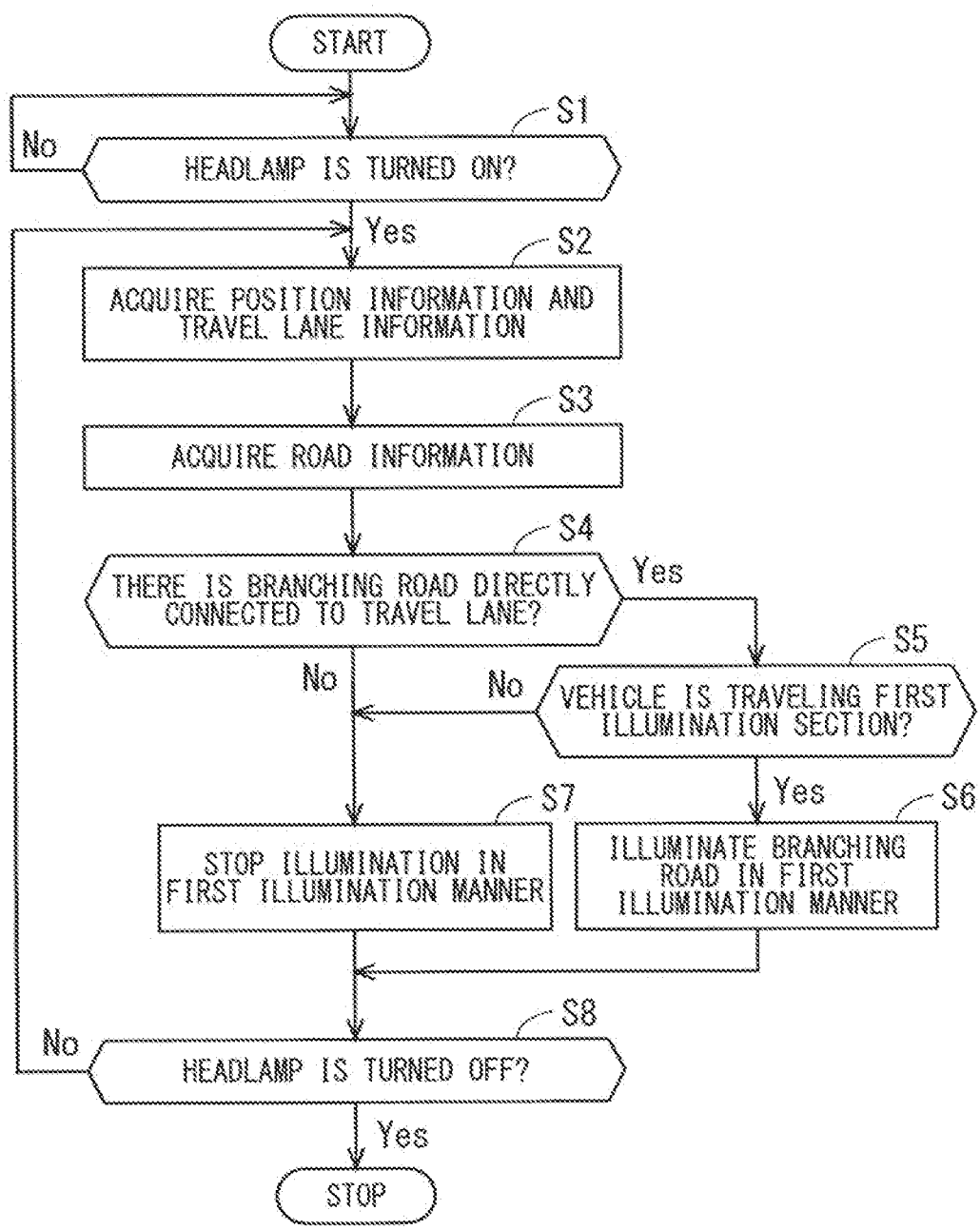
FIG. 3 is a flowchart showing operation of the driving assistance apparatus according to Embodiment 2.

FIG. 3 is a flowchart showing operation of the driving assistance apparatus 1 according to Embodiment 2. Operation in FIG. 3 is performed anytime during travel of the vehicle.

First, in step S1, the illumination controller 12a determines whether the headlamp 31 is turned on to perform illumination. Illumination by the headlamp 31 may be high beam illumination of a road 100 m ahead of the vehicle, for example, or may be low beam illumination of a road 40 m ahead of the vehicle, for example. Description will be made below based on the assumption that illumination by the headlamp 31 is high beam illumination. Processing proceeds to step S2 when it is determined that the headlamp 31 performs illumination, and processing in step S1 is performed again when it is not determined that the headlamp 31 performs illumination.

In step S2, the vehicle position acquisition unit 11b acquires the position information and the travel lane information from the high-precision positioning unit 22 of the high-precision locator apparatus 2.

In step S3, the road information acquisition unit 11a acquires the road information from the high-precision map DB 21 of the high-precision locator apparatus 2. The road information acquisition unit 11a may acquire only the road information on surroundings of the vehicle from the high-precision map DB 21.

In step S4, the illumination controller 12a determines whether there is the branching road directly connected to the travel lane based on the travel lane information and the road information. Processing proceeds to step S5 when it is determined that there is the branching road and proceeds to step S7 when it is not determined that there is the branching road.

In step S5, the illumination controller 12a determines whether the vehicle is traveling the first illumination section based on the branching road determined in step S4 and the position information. Processing proceeds to step S6 when it is determined that the vehicle is traveling the first illumination section and proceeds to step S7 when it is not determined that the vehicle is traveling the first illumination section.

In step S6, the illumination controller 12a performs control to turn on the sub-lamp 32 and cause the sub-lamp 32 to illuminate the branching road in the first illumination manner. Illumination by the headlamp 31 is maintained unless the driver performs operation to turn off the headlamp 31 and the like. Processing then proceeds to step S8.

In step S7, when the sub-lamp 32 performs illumination in the first illumination manner, the illumination controller 12a causes the sub-lamp 32 to stop the illumination. Illumination by the headlamp 31 is maintained unless the driver performs operation to turn off the headlamp 31 and the like. Processing then proceeds to step S8.

In step S8, the illumination controller 12a determines whether the headlamp 31 is turned off. Operation in FIG. 3 ends when it is determined that the headlamp 31 is turned off, and processing returns to step S2 when it is not determined that the headlamp 31 is turned off.

Figure 4:
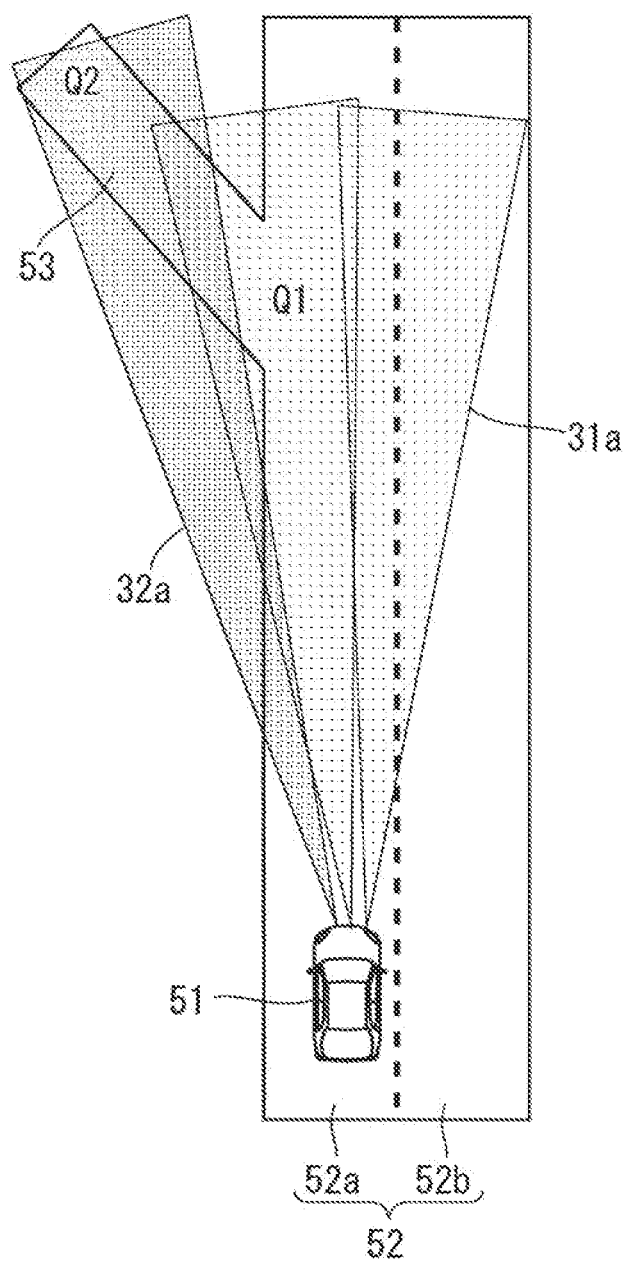
FIG. 4 is a diagram for describing operation of the driving assistance apparatus according to Embodiment 2.
Figure 5:
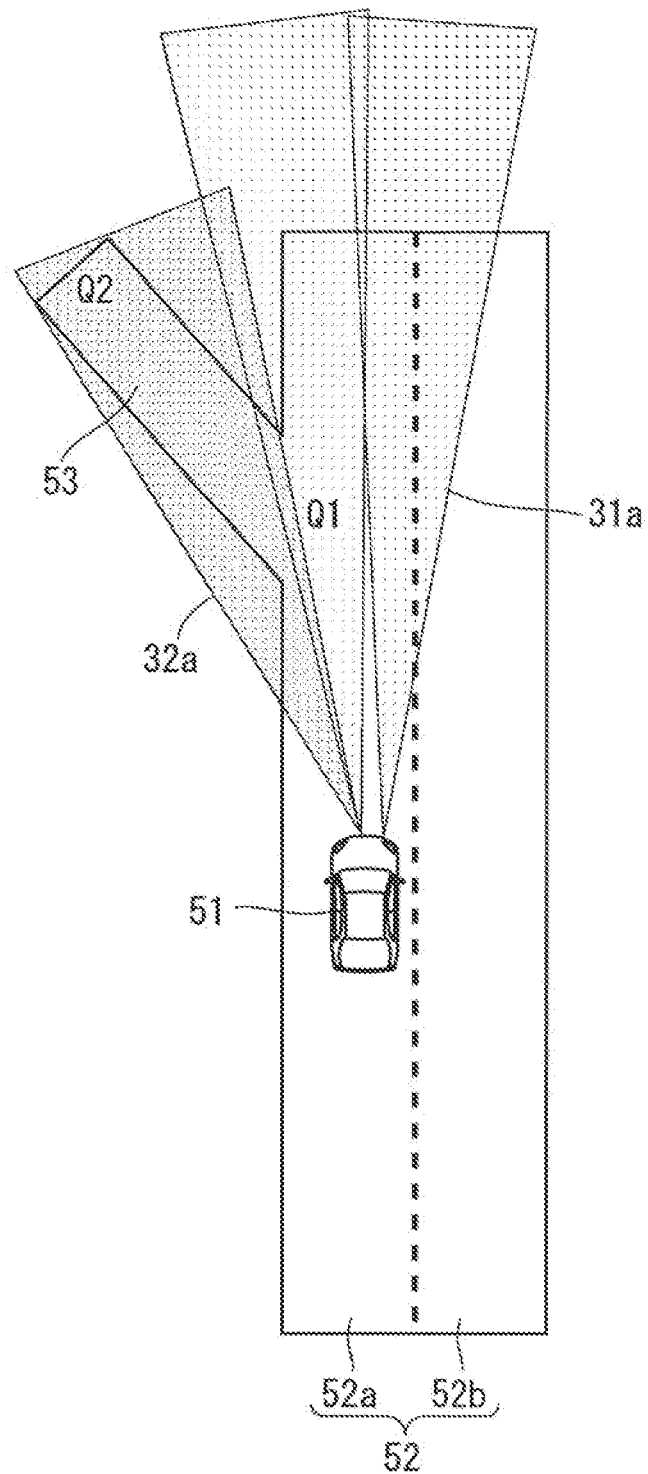
FIG. 5 is a diagram for describing operation of the driving assistance apparatus according to Embodiment 2.
Figure 6:
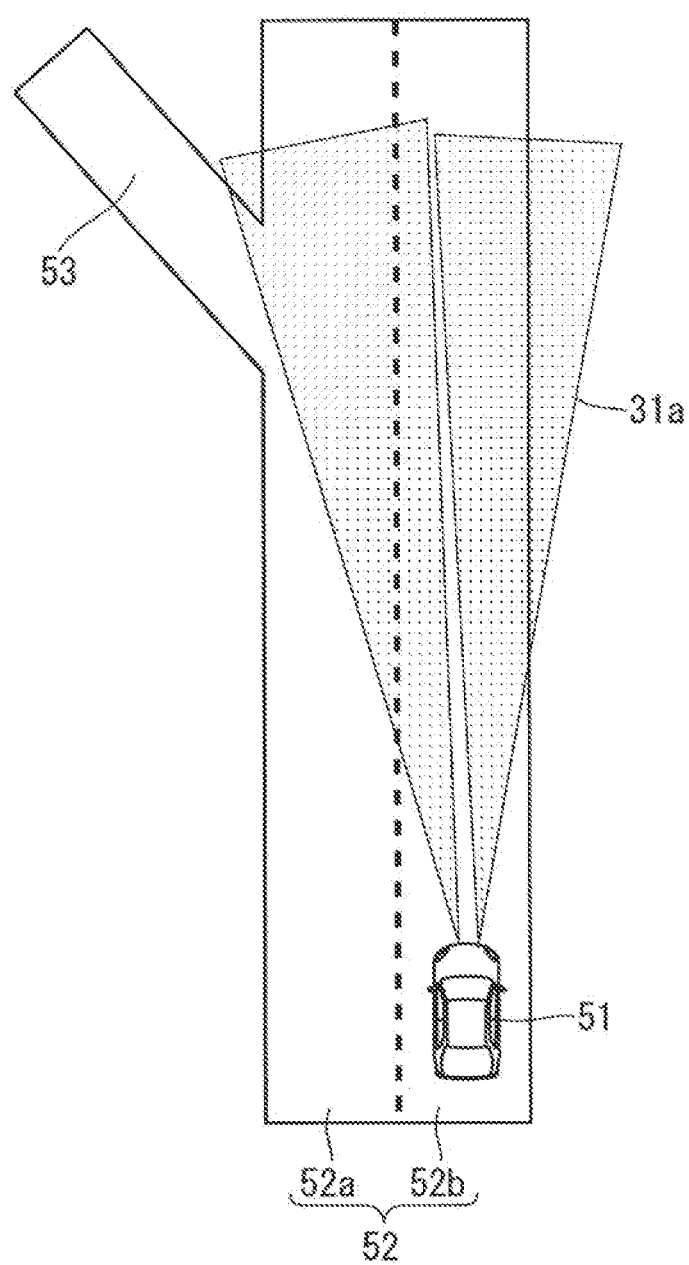
FIG. 6 is a diagram for describing operation of the driving assistance apparatus according to Embodiment 2.
Figure 7:
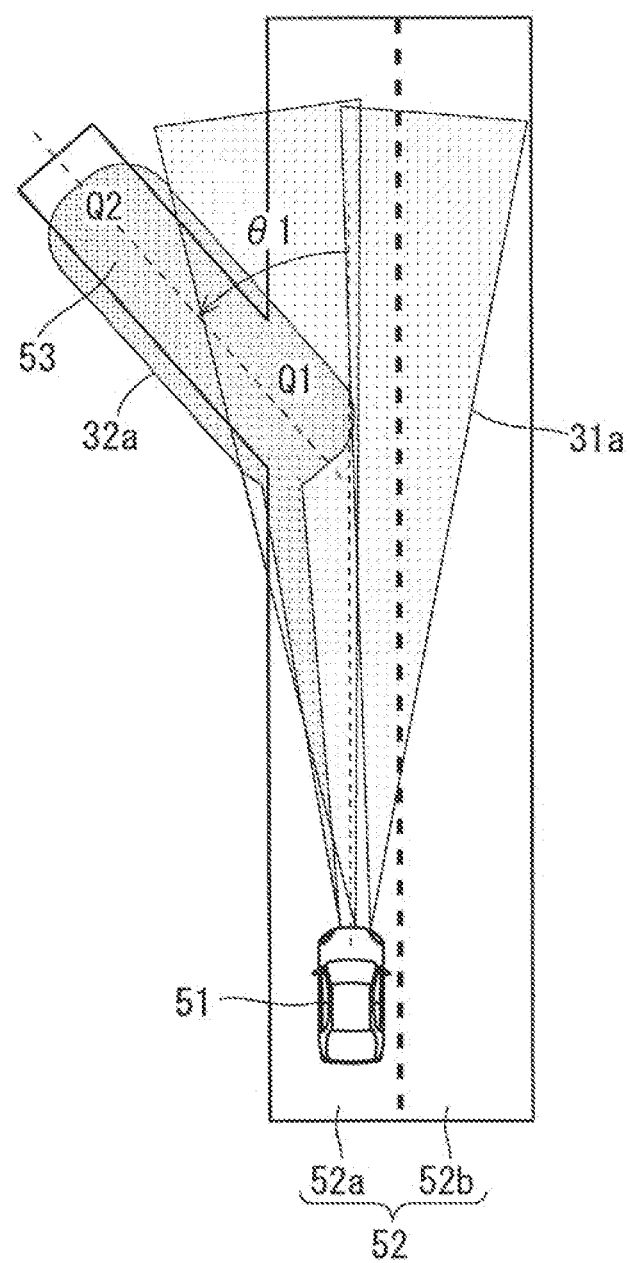
FIG. 7 is a diagram for describing operation of a driving assistance apparatus according to Modification 3 of Embodiment 2.
Figure 8:
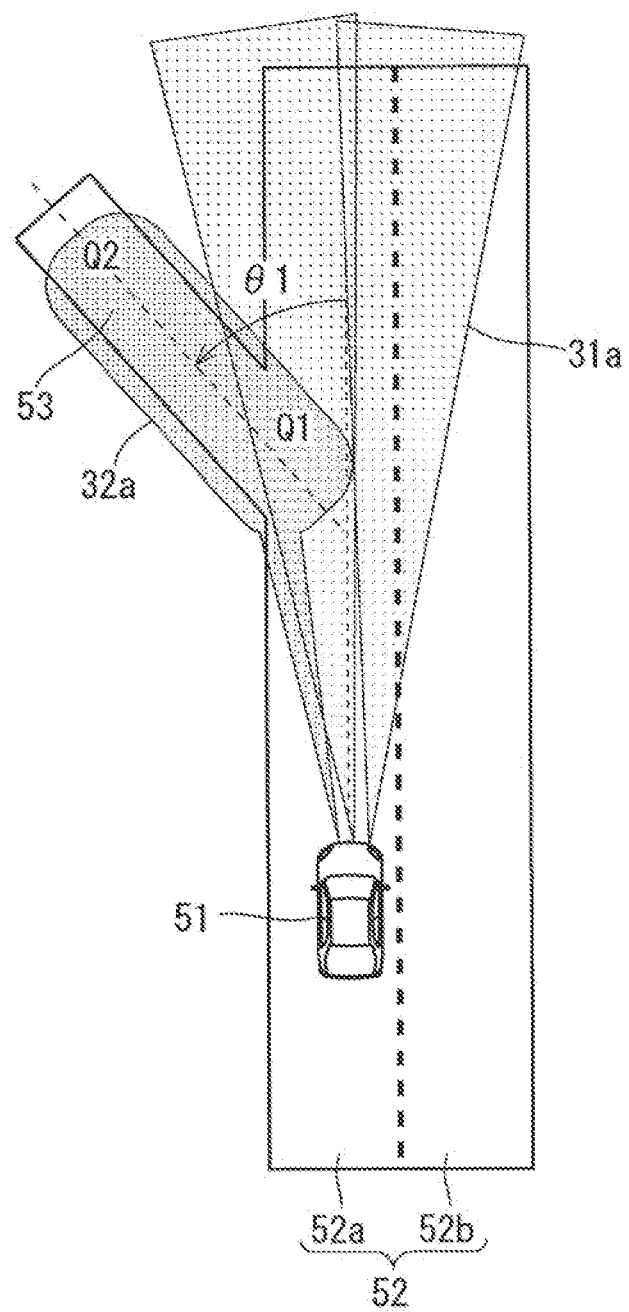
FIG. 8 is a diagram for describing operation of the driving assistance apparatus according to Modification 3 of Embodiment 2.
Figure 9:
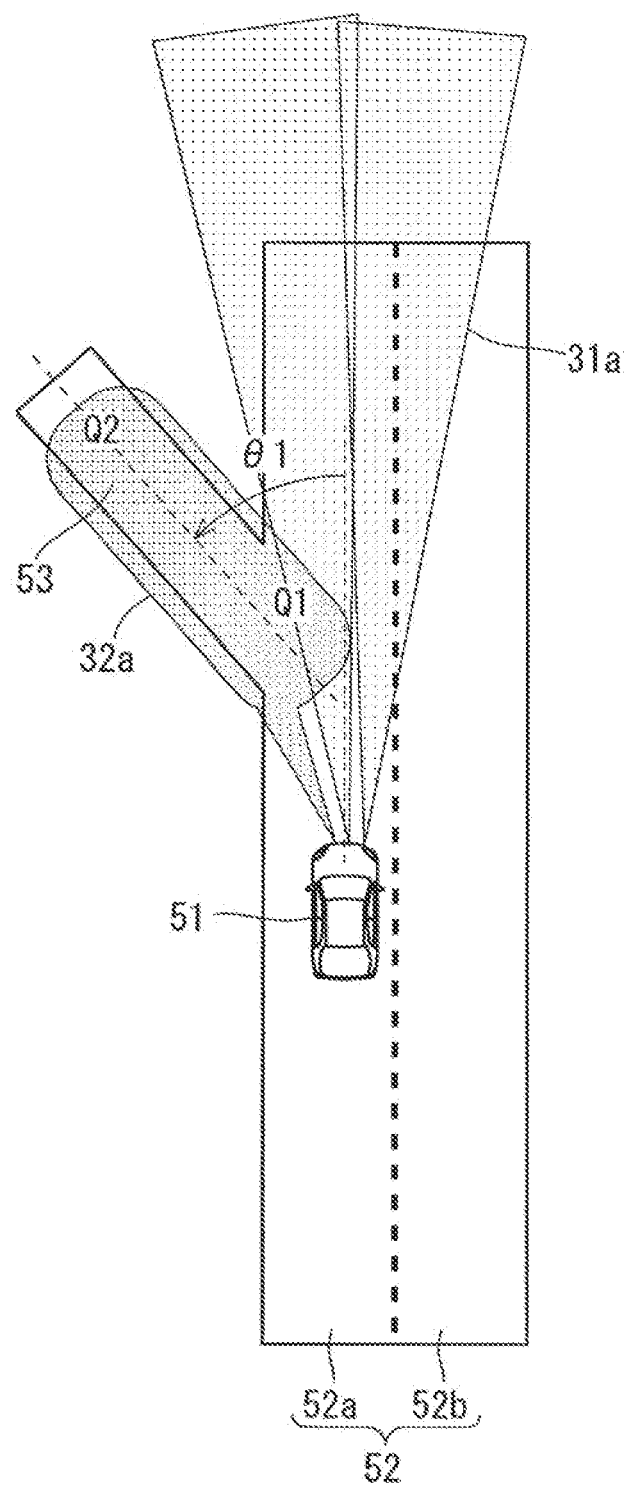
FIG. 9 is a diagram for describing operation of the driving assistance apparatus according to Modification 3 of Embodiment 2.
Figure 10:
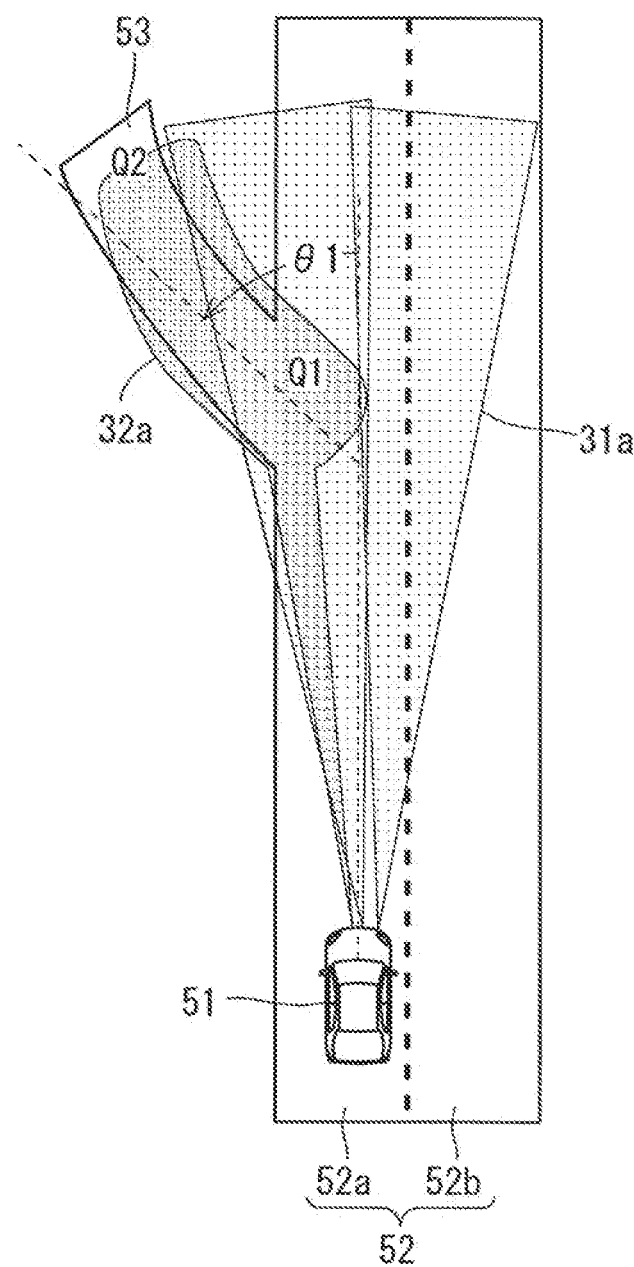
FIG. 10 is a diagram for describing operation of the driving assistance apparatus according to Modification 3 of Embodiment 2.

FIGS. 4 to 6 are diagrams for describing operation of the driving assistance apparatus 1 according to Embodiment 2.

A road 52 includes a left lane 52a and a right lane 52b. The left lane 52a is directly connected to a branching road 53. On the other hand, the right lane 52b is not directly connected to the branching road 53 and is indirectly connected to the branching road 53.

In FIGS. 4 and 5, a travel lane of a vehicle 51 is the left lane 52a directly connected to the branching road 53, and the vehicle 51 is traveling a point 100 m or less away from a branching point Q1 of the branching road 53 from the left lane 52a, that is, the first illumination section. In this case, processing in steps S4, S5, and S6 in FIG. 3 is performed, so that the headlamp 31 illuminates an illumination range 31a including the travel lane ahead of the vehicle 51, and the sub-lamp 32 illuminates an illumination range 32a including a point Q2 on the branching road 53. The point Q2 is a point a predetermined distance (e.g., 10 m) away from the branching point Q1. The illumination controller 12a according to Embodiment 2 controls the first illumination manner of the sub-lamp 32 so that the illumination range 32a includes the point Q2 based on a planar shape of the branching road 53 included in the road information.

The illumination controller 12a may control the first illumination manner of the sub-lamp 32 based on a distance between a position of the vehicle 51 and the branching point Q1. For example, as illustrated in FIGS. 4 and 5, the illumination controller 12a may control a direction of the illumination range 32a of the sub-lamp 32 so that the illumination range 32a of the sub-lamp 32 approaches a direction to the left of the vehicle 51 as the distance between the position of the vehicle 51 and the branching point Q1 decreases. The illumination controller 12a may also control a width of the illumination range 32a of the sub-lamp 32 so that the width of the illumination range of the sub-lamp 32 increases with decreasing distance between the position of the vehicle 51 and the branching point Q1. The illumination controller 12a may also control illumination by the sub-lamp 32 so that time intervals to control the illumination range 32a of the sub-lamp 32 are reduced as the distance between the position of the vehicle 51 and the branching point Q1 decreases.

When the vehicle 51 has passed through the branching point Q1, the vehicle 51 is no longer traveling the first illumination section, and processing in steps S4, S5, and S7 in FIG. 3 is performed, so that, while the headlamp 31 illuminates the illumination range 31a, the sub-lamp 32 does not perform illumination.

In FIG. 6, between the branching road 53 and the right lane 52b as a travel lane of the vehicle 51, there is the left lane 52a other than the travel lane, so that the branching road 53 is indirectly connected to the travel lane. In this case, processing in steps S4 and S7 in FIG. 3 is performed, so that, while the headlamp 31 illuminates the illumination range 31a, the sub-lamp 32 does not perform illumination. When the vehicle 51 changes lanes from the right lane 52b to the left lane 52a in a state illustrated in FIG. 6, processing in steps S4, S5, and S6 in FIG. 3 is performed, so that the headlamp 31 illuminates the illumination range 31a, and the sub-lamp 32 illuminates the illumination range 32a.

A case where the road 52 includes two lanes (the left lane 52a and the right lane 52b), and the left lane 52a is directly connected to the branching road has been described above as an example. Even if the road includes three or more lanes or the right lane is directly connected to the branching road, the sub-lamp 32 performs illumination in the first illumination manner when the travel lane of the vehicle 51 is directly connected to the branching road as in the above-mentioned example.

Summary of Embodiment 2

According to the driving assistance apparatus 1 according to Embodiment 2 as described above, the lighting apparatus 3 can appropriately be controlled as in Embodiment 1. In Embodiment 2, the lighting apparatus 3 includes the headlamp 31 and the sub-lamp 32, so that the sub-lamp 32 can illuminate the branching road while the headlamp 31 illuminates the travel lane ahead of the vehicle.

In Embodiment 2, the sub-lamp 32 stops illumination in the first illumination manner when it is not determined that there is the branching road directly connected to the travel lane and the vehicle is traveling the first illumination section. A difference in visual perception of the driver is relatively large between a state in which the sub-lamp 32 performs illumination and a state in which the sub-lamp 32 does not perform illumination, so that, according to the above-mentioned configuration, the driver can easily recognize the presence of the branching road when the sub-lamp 32 performs illumination.

Modification 1 of Embodiment 2

While the lighting apparatus 3 includes the headlamp 31 performing illumination ahead of the vehicle and the sub-lamp 32 performing assistive illumination of the branching road in Embodiment 2, a configuration of the lighting apparatus 3 is not limited to this configuration. For example, the lighting apparatus 3 may be a single lamp having both a forward illumination function and an assistive illumination function. The sub-lamp 32 may include a left lamp performing illumination to the left and ahead of the vehicle and a right lamp performing illumination to the right and ahead of the vehicle.

Modification 2 of Embodiment 2

There is a single branching road in the first illumination section in Embodiment 2. When there are a plurality of branching roads in the first illumination section, the illumination controller 12a may cause the sub-lamp 32 to simultaneously illuminate the plurality of branching roads. When the sub-lamp 32 does not have a function of simultaneously illuminating the plurality of branching roads, the illumination controller 12a may cause the sub-lamp 32 to sequentially illuminate the branching roads from the one closer to the vehicle.

Modification 3 of Embodiment 2

While the illumination controller 12a controls the first illumination manner of the sub-lamp 32 so that the sub-lamp 32 illuminates the point Q2 on the branching road based on the planar shape of the branching road in Embodiment 2, control of the first illumination manner is not limited to such control. For example, the illumination controller 12a may calculate an angle between the travel lane and the branching road at the branching point based on the road information and control the first illumination manner of the sub-lamp 32 based on the angle.

In cases of FIGS. 7 to 10, the illumination controller 12a determines an angle θ1 between the left lane 52a as the travel lane and the branching road 53 at the branching point Q1 based on map information. The illumination controller 12a performs control to direct a major axis of the illumination range 32a of the sub-lamp 32 in a direction rotated from a position ahead of the vehicle 51 to the left around the branching point Q1 by the angle θ1. With technology disclosed in Japanese Patent Application Laid-Open No. 2016-30515, for example, the sub-lamp 32 is controlled by the illumination controller 12a to spot illuminate the illumination range 32a matching the shape of the branching road 53 even if the vehicle 51 is not located close to the branching point Q1. The illumination range 32a of the sub-lamp 32 is generally linear in FIGS. 7 to 9 as the branching road 53 is generally linear, and the illumination range 32a of the sub-lamp 32 is generally curved in FIG. 10 as the branching road 53 is curved.

Figure 11:
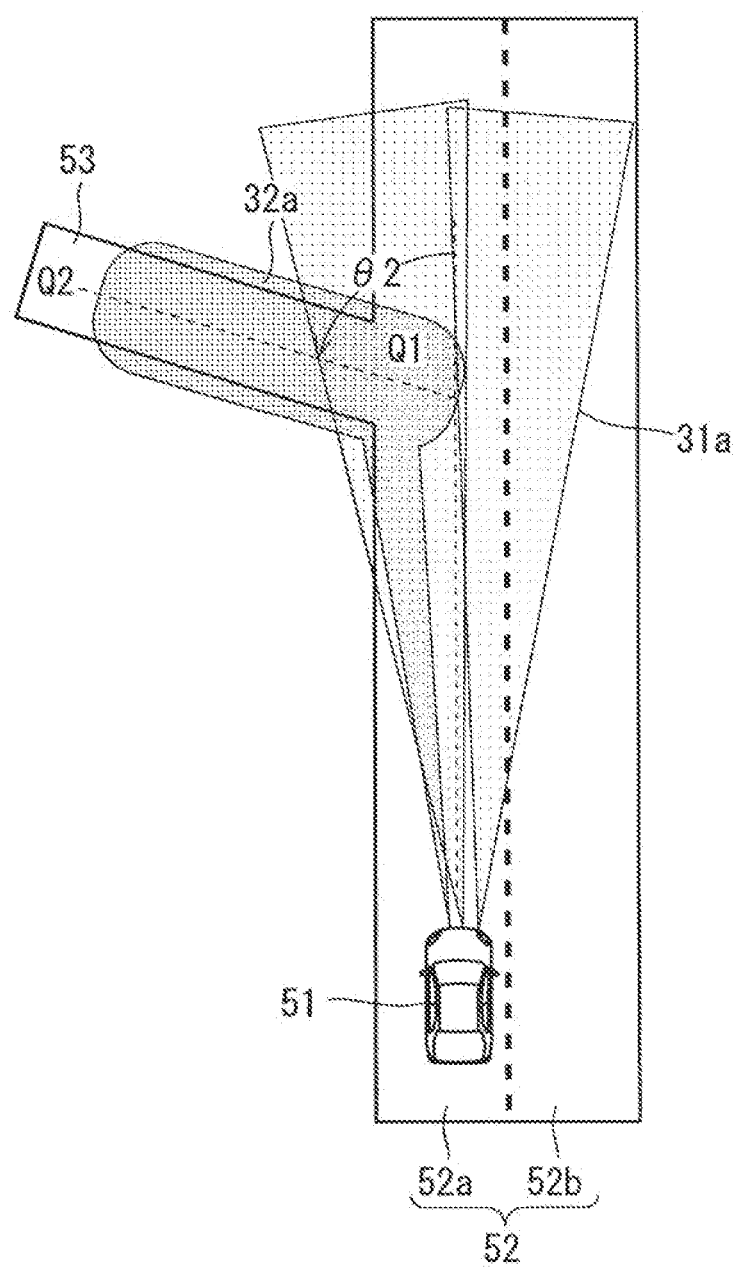
FIG. 11 is a diagram for describing operation of the driving assistance apparatus according to Modification 3 of Embodiment 2.

In a case of FIG. 11, the illumination controller 12a performs, based on an angle θ2 between the left lane 52a as the travel lane and the branching road 53 at the branching point Q1, control to direct the major axis of the illumination range 32a of the sub-lamp 32 in a direction rotated from the position ahead of the vehicle 51 to the left around the branching point Q1 by the angle θ2.

Modification 4 of Embodiment 2

While the headlamp 31 linearly performs illumination ahead of the vehicle in Embodiment 2, illumination by the headlamp 31 is not limited to such illumination. For example, the illumination controller 12a may control the first illumination manner of the sub-lamp 32 based on the planar shape of the branching road while controlling an illumination manner of the headlamp 31 based on a planar shape of the travel lane.

As the illumination manner of the headlamp 31, the illumination controller 12a may control a direction and a shape of the illumination range of the headlamp 31 based on the planar shape of the travel lane. For example, when the travel lane is a lane curved to the right (or to the left), the illumination controller 12a may control the illumination range of the headlamp 31 so that the shape of the illumination range of the headlamp 31 corresponds to the shape of the curve of the travel lane. When the road information indicates a grade of the travel lane, that is, an inclination of the travel lane, for example, the illumination controller 12a may control a vertical direction of illumination by the headlamp 31. According to Modification 4 as described above, the headlamp 31 can appropriately illuminate the travel lane.

Modification 5 of Embodiment 2

While description has been made based on the assumption that the grade of the travel lane and a grade of the branching road are the same in Embodiment 2, their grades are actually often different from each other. The illumination controller 12a may thus control the first illumination manner of the sub-lamp 32 by reading the grade of the travel lane and the grade of the branching road from the road information and controlling a vertical direction of illumination by the sub-lamp 32 based on a difference in grade between them. According to Modification 5 as described above, the sub-lamp 32 can illuminate the branching road to an appropriate distance.

When the difference in grade between the travel lane and the branching road read from the road information is equal to or more than a threshold, the first illumination manner of the sub-lamp 32 may include illumination with at least any of characters, graphics, or signs indicating the difference.

Modification 6 of Embodiment 2

The driving assistance apparatus 1 may include an unillustrated path information acquisition unit included in the concept of the acquisition unit 11 similarly to the road information acquisition unit 11a and the vehicle position acquisition unit 11b in FIG. 2. The path information acquisition unit acquires travel path information indicating a path along which the vehicle is to travel. The path along which the vehicle is to travel is a path searched for by a navigation system, for example.

The illumination controller 12a may control the first illumination manner of the sub-lamp 32 based on whether the path indicated by the travel path information acquired by the path information acquisition unit enters the branching road. That is to say, the illumination controller 12a may control the first illumination manner of the sub-lamp 32 based on whether the vehicle is to enter the branching road.

Figure 12:
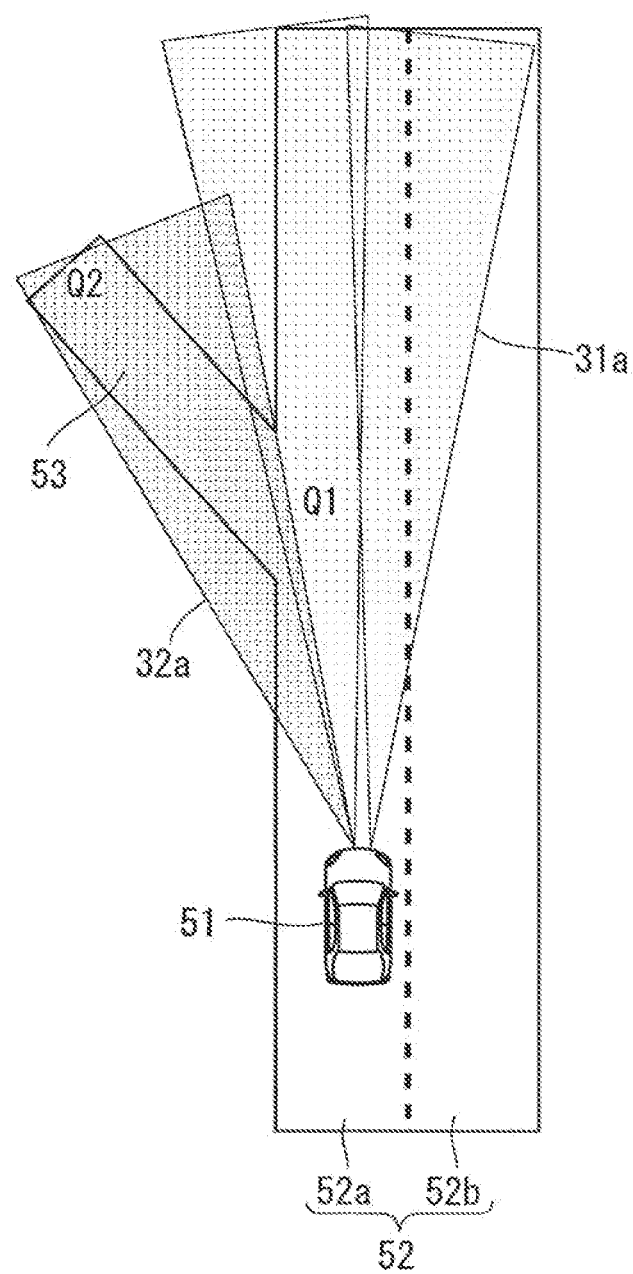
FIG. 12 is a diagram for describing operation of a driving assistance apparatus according to Modification 6 of Embodiment 2.
Figure 13:
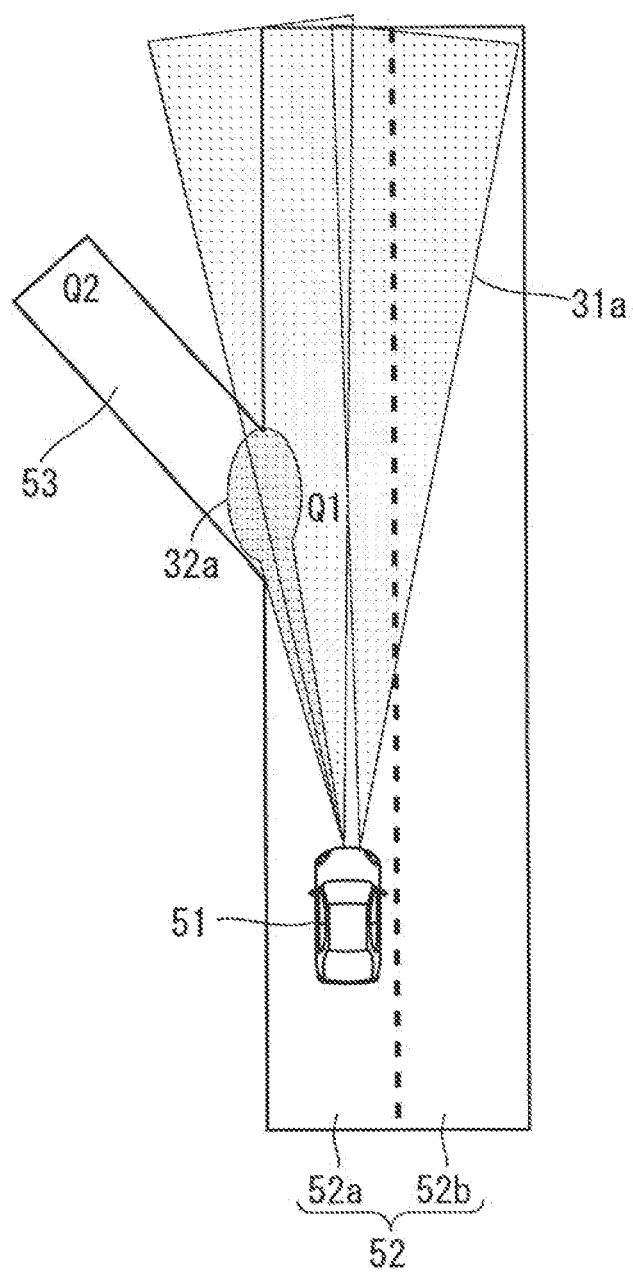
FIG. 13 is a diagram for describing operation of the driving assistance apparatus according to Modification 6 of Embodiment 2.
Figure 14:
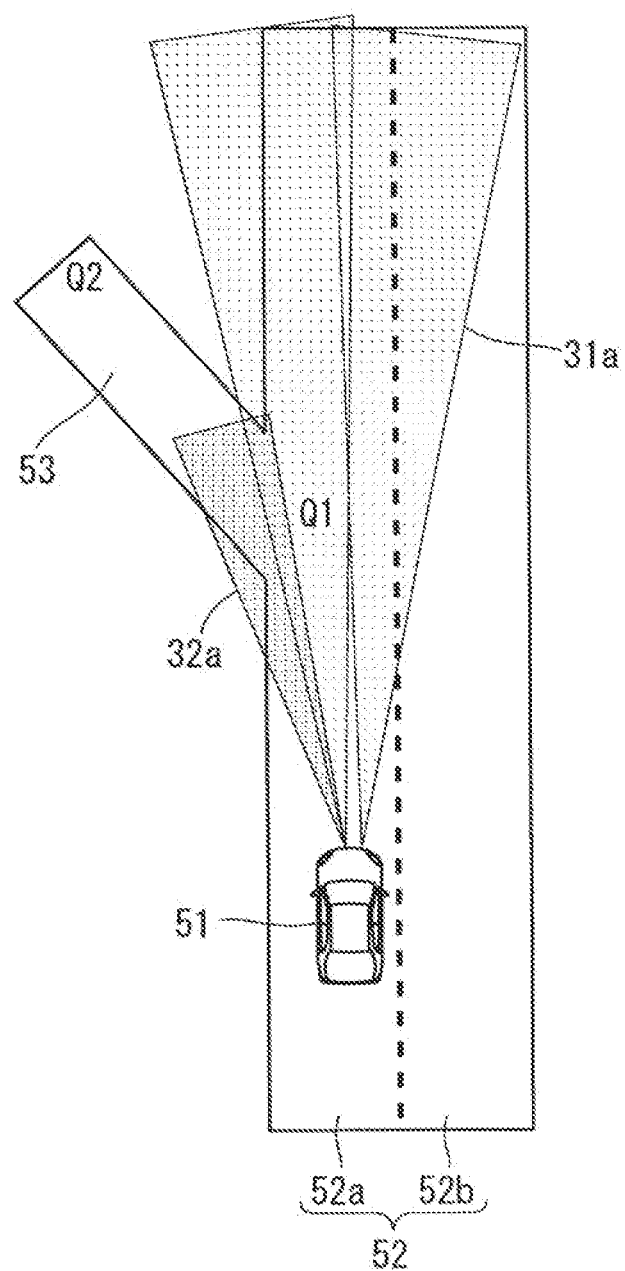
FIG. 14 is a diagram for describing operation of the driving assistance apparatus according to Modification 6 of Embodiment 2.

FIGS. 12 to 14 are diagrams for describing operation of the driving assistance apparatus 1 according to Modification 6.

FIG. 12 is a diagram illustrating a case where the path indicated by the travel path information enters the branching road, that is, the vehicle 51 is to enter the branching road 53. FIGS. 13 and 14 are diagrams each illustrating a case where the path indicated by the travel path information does not enter the branching road, that is, the vehicle 51 is not to enter the branching road 53.

While the illumination range 32a of the sub-lamp 32 in FIG. 12 includes a portion of the branching road 53 slightly farther than a connection port of the branching road 53, the illumination range 32a of the sub-lamp 32 in each of FIGS. 13 and 14 includes only the connection port of the branching road 53. According to such a configuration, the illumination range 32a of the sub-lamp 32 in FIG. 12 is made larger and more prominent than the illumination range 32a of the sub-lamp 32 in each of FIGS. 13 and 14, so that the driver can easily know whether to enter the branching road 53.

When the path indicated by the travel path information does not enter the branching road, the sub-lamp 32 may spot illuminate an elliptical range as illustrated in FIG. 13 or may illuminate a range having a normal shape as illustrated in FIG. 14. The first illumination manner of the sub-lamp 32 may include illumination promoting travel in the travel lane or may include illumination with at least any of characters, graphics, or signs promoting travel on the branching road.

When the travel lane of the vehicle 51 is the right lane 52b indirectly connected to the branching road 53 without being directly connected to the branching road 53, the headlamp 31 illuminates the illumination range 31a but the sub-lamp 32 does not perform illumination as in Embodiment 2.

Modification 7 of Embodiment 2

The first illumination section may be changed depending on whether illumination by the headlamp 31 is high beam illumination or low beam illumination. For example, when illumination by the headlamp 31 is high beam illumination, the first illumination section may be a section in the travel lane within 100 m from the branching point. When illumination by the headlamp 31 is low beam illumination, the first illumination section may be a section in the travel lane within 40 m from the branching point.

Embodiment 3

Figure 15:
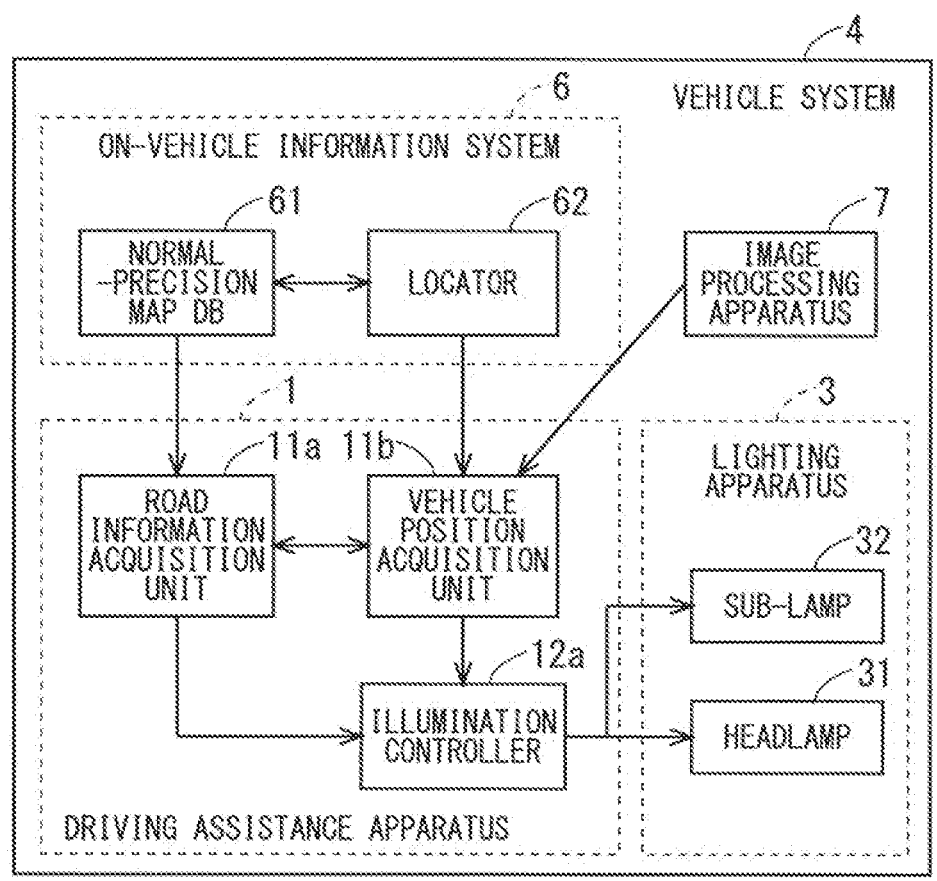
FIG. 15 is a block diagram showing a configuration of a driving assistance apparatus according to Embodiment 3.

FIG. 15 is a block diagram showing a configuration of a driving assistance apparatus 1 according to Embodiment 3. From among components according to Embodiment 3, the same components as or similar components to the above-mentioned components bear the same reference signs as or similar reference signs to those of the same or similar components, and different components will mainly be described below.

The configuration of the driving assistance apparatus 1 in FIG. 15 is similar to a configuration obtained by replacing the high-precision locator apparatus 2 in the configuration of the driving assistance apparatus 1 in FIG. 2 with an on-vehicle information system 6 and an image processing apparatus 7.

The on-vehicle information system 6 includes a normal-precision map database (DB) 61 and a locator 62. The normal-precision map DB 61 stores the road information for each road. The locator 62 detects the position information of the vehicle for each road based on the signal from the satellite, such as the GPS. The locator 62 may perform map matching processing based on the detected position information and the road information stored in the normal-precision map DB 61. The normal-precision map DB 61 and the locator 62 may be a map DB and a locator dedicated for the driving assistance apparatus 1 or may be a map DB and a locator shared with a navigation system.

The image processing apparatus 7 recognizes the travel lane information indicating the travel lane in which the vehicle is traveling based on an image of surroundings of the vehicle (e.g., an image ahead of the vehicle).

The road information acquisition unit 11a acquires the road information from the normal-precision map DB 61. The vehicle position acquisition unit 11b acquires the position information and the travel lane information respectively from the locator 62 and the image processing apparatus 7. The illumination controller 12a and the lighting apparatus 3 are similar to the illumination controller 12a and the lighting apparatus 3 according to Embodiment 2.

Summary of Embodiment 3

According to the driving assistance apparatus 1 according to Embodiment 3 as described above, the normal-precision map DB 61, which is inexpensive, and the locator 62, which is normal, are used, so that costs of the driving assistance apparatus 1 can be reduced.

Modification 1 of Embodiment 3

The road information stored in the normal-precision map DB 61 may include the number of lanes, and the image processing apparatus 7 may recognize the travel lane information based on the image of surroundings of the vehicle and the number of lanes. According to such a configuration, the precision of the travel lane information can be increased.

Modification 2 of Embodiment 3

While the position information and the road information can be acquired from the on-vehicle information system 6 in Embodiment 3, the configuration is not limited to this configuration.

Figure 16:
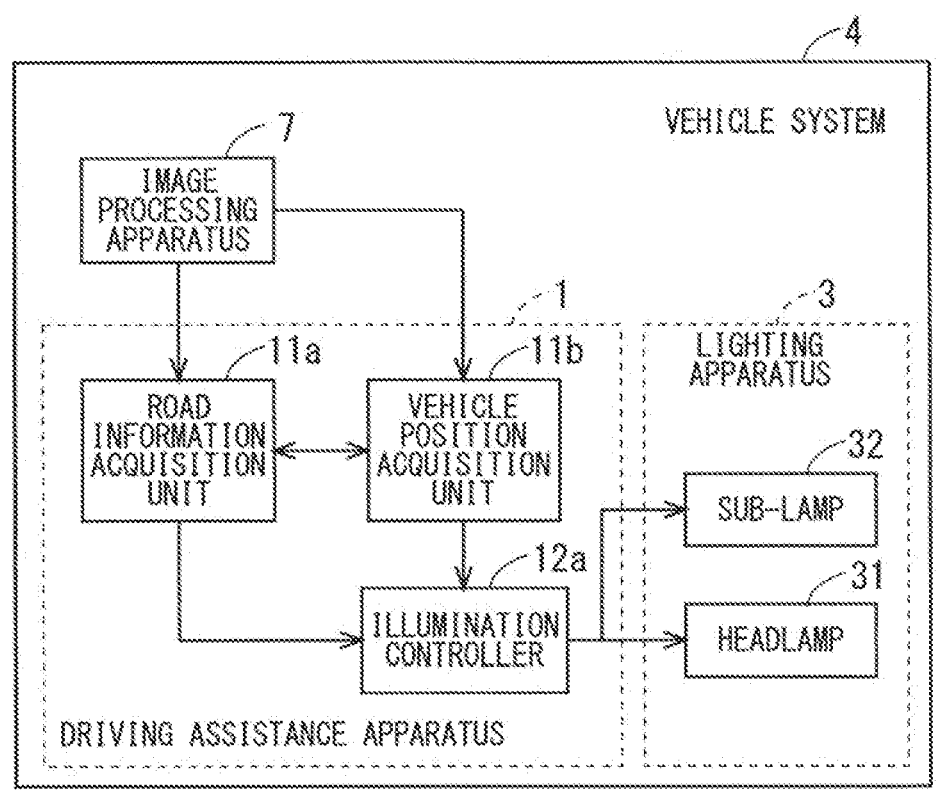
FIG. 16 is a block diagram showing a configuration of a driving assistance apparatus according to Modification 2 of Embodiment 3.

For example, as shown in FIG. 16, the image processing apparatus 7 may recognize not only the travel lane information but also the position information and the road information based on the image of surroundings of the vehicle (e.g., the image ahead of the vehicle) without providing the on-vehicle information system 6. The road information acquisition unit 11a may acquire the road information from the image processing apparatus 7, and the vehicle position acquisition unit 11b may acquire the position information and the travel lane information from the image processing apparatus 7.

The image processing apparatus 7 may include the functions of the road information acquisition unit 11a and the vehicle position acquisition unit 11b and part of the function of the illumination controller 12a. For example, the image processing apparatus 7 may determine whether there is the branching road directly connected to the travel lane based on the travel lane information and the road information. When it is determined that there is the branching road directly connected to the travel lane, the image processing apparatus 7 may calculate, based on the position information and the branching point of the branching road, the distance between the position of the vehicle and the branching point. The illumination controller 12a may perform control to cause the sub-lamp 32 to illuminate the branching road in the first illumination manner based on the distance calculated by the image processing apparatus 7.

In Embodiment 3, while one of the normal-precision map DB 61 and the normal locator 62 of the on-vehicle information system 6 is provided, the function of the other one of the normal-precision map DB 61 and the locator 62 may be achieved by the image processing apparatus 7.

Embodiment 4

A block diagram of a driving assistance apparatus 1 according to Embodiment 4 is similar to the block diagram of the driving assistance apparatus 1 according to Embodiment 2 (see FIG. 2). From among components according to Embodiment 4, the same components as or similar components to the above-mentioned components bear the same reference signs as or similar reference signs to those of the same or similar components, and different components will mainly be described below.

The illumination controller 12a according to Embodiment 4 performs, on a merging road, processing similar to processing performed on the branching road. That is to say, the illumination controller 12a determines, based on the position information, the travel lane information, and the road information, whether there is a merging road directly connected to the travel lane and whether the vehicle is traveling a second illumination section.

The second illumination section is a section satisfying a predetermined positional relationship with a merging point of the merging road into the travel lane. In Embodiment 4, the second illumination section is similar to the first illumination section and is a section of the travel lane between the merging point of the merging road into the travel lane and a point a predetermined distance (e.g., 100 m) away from the merging point toward the vehicle, for example.

When it is determined, as a result of determination described above, that there is the merging road directly connected to the travel lane and the vehicle is traveling the second illumination section, the illumination controller 12a performs control to cause the sub-lamp 32 to illuminate the merging road in a second illumination manner. In Embodiment 4, the second illumination manner is similar to the first illumination manner. For example, the illumination controller 12a may control the second illumination manner of the sub-lamp 32 based on a distance between the position of the vehicle and the merging point.

Operation

Figure 17:
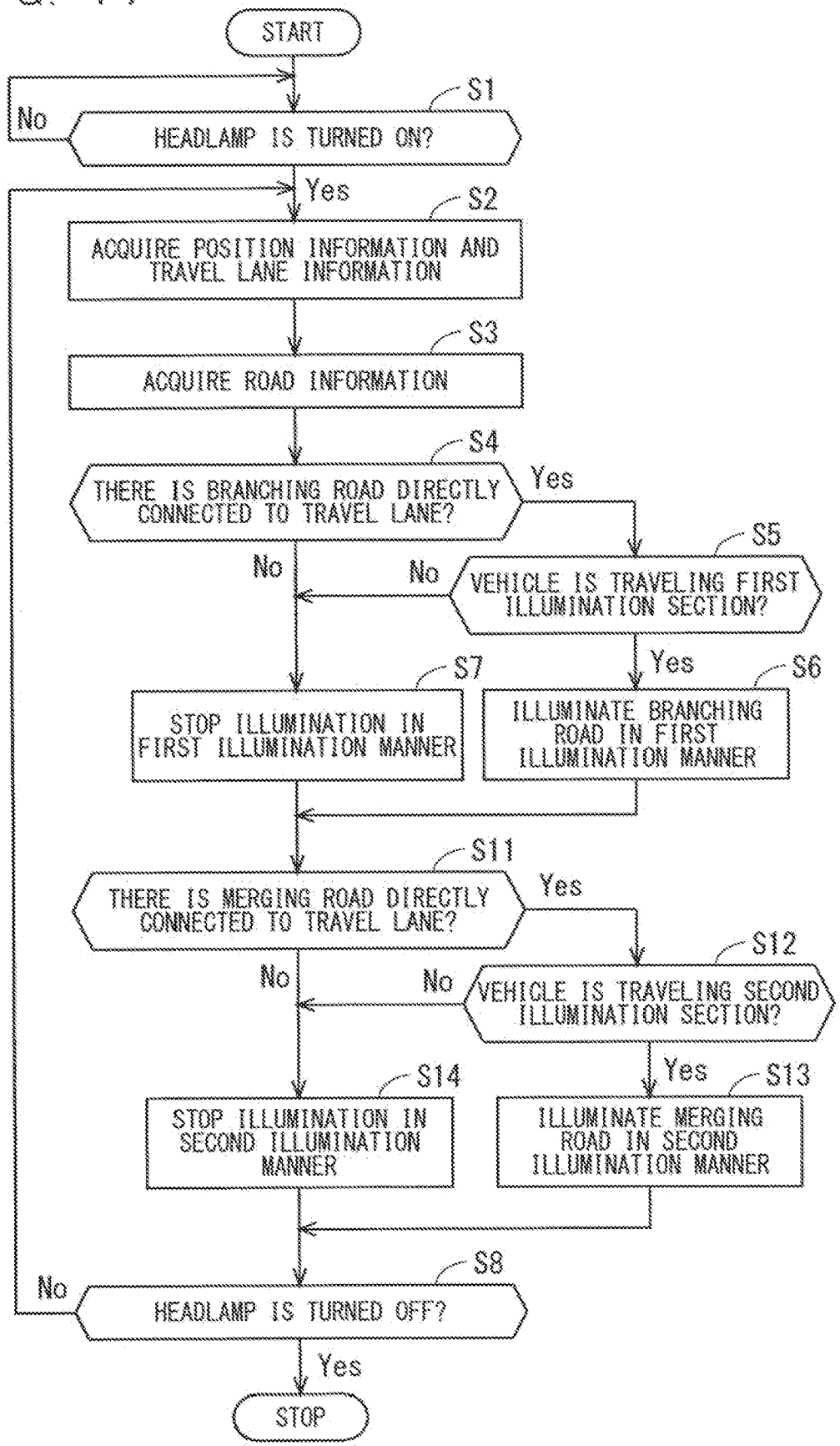
FIG. 17 is a flowchart showing operation of a driving assistance apparatus according to Embodiment 4.

FIG. 17 is a flowchart showing operation of the driving assistance apparatus 1 according to Embodiment 4. Operation in FIG. 17 is performed anytime during travel of the vehicle.

First, in steps S1 to S7, operation similar to that in steps S1 to S7 in FIG. 3 is performed. After step S6 or S7, processing in step S11 is performed.

In step S11, the illumination controller 12a determines whether there is the merging road directly connected to the travel lane based on the travel lane information and the road information. Processing proceeds to step S12 when it is determined that there is the merging road and proceeds to step S14 when it is not determined that there is the merging road.

In step S12, the illumination controller 12a determines whether the vehicle is traveling the second illumination section based on the merging road determined in step S11 and the position information. Processing proceeds to step S13 when it is determined that the vehicle is traveling the second illumination section and proceeds to step S14 when it is not determined that the vehicle is traveling the second illumination section.

In step S13, the illumination controller 12a performs control to turn on the sub-lamp 32 and cause the sub-lamp 32 to illuminate the merging road in the second illumination manner. Illumination by the headlamp 31 is maintained unless the driver performs operation to turn off the headlamp 31 and the like. Processing then proceeds to step S8.

In step S14, when the sub-lamp 32 performs illumination in the second illumination manner, the illumination controller 12a causes the sub-lamp 32 to stop the illumination. Illumination by the headlamp 31 is maintained unless the driver performs operation to turn off the headlamp 31 and the like. Processing then proceeds to step S8.

In step S8, the illumination controller 12a determines whether the headlamp 31 is turned off. Operation in FIG. 17 ends when it is determined that the headlamp 31 is turned off, and processing returns to step S2 when it is not determined that the headlamp 31 is turned off.

When the travel lane is directly connected to neither the branching road nor the merging road as a result of the above-mentioned operation, the sub-lamp 32 does not perform illumination, and only the headlamp 31 performs illumination in principle. When there are both the branching road and the merging road directly connected to the travel lane, the illumination controller 12a may cause the sub-lamp 32 to simultaneously illuminate the branching road and the merging road. When the sub-lamp 32 does not have a function of simultaneously illuminating the branching road and the merging road, the sub-lamp 32 may sequentially illuminate the branching road and the merging road from the one closer to the vehicle or may preferentially illuminate the branching road.

Summary of Embodiment 4

According to the driving assistance apparatus 1 according to Embodiment 4 as described above, control to cause the sub-lamp 32 to illuminate the merging road directly connected to the travel lane in the second illumination manner is performed when it is determined that there is the merging road and the vehicle is traveling the second illumination section. According to such a configuration, control to cause the sub-lamp 32 to illuminate the merging road can be performed in a section in which the vehicle is an appropriate distance away from the merging point, so that the sub-lamp 32 can appropriately be controlled.

Modification 1 of Embodiment 4

While the second illumination manner is described to be similar to the first illumination manner in Embodiment 4, the first illumination manner and the second illumination manner may be different from each other.

As a first example, a color tone of illumination in the first illumination manner and a color tone of illumination in the second illumination manner may be different from each other.

Figure 18:
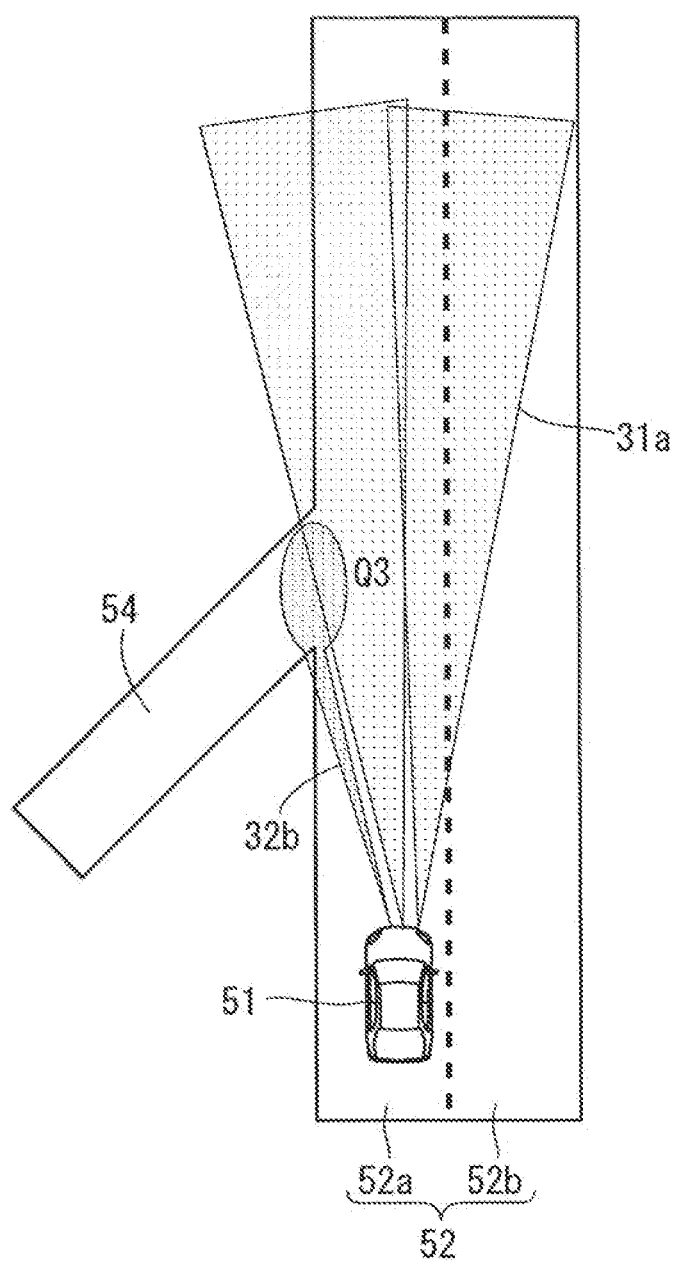
FIG. 18 is a diagram for describing operation of a driving assistance apparatus according to Modification 1 of Embodiment 4.
Figure 19:
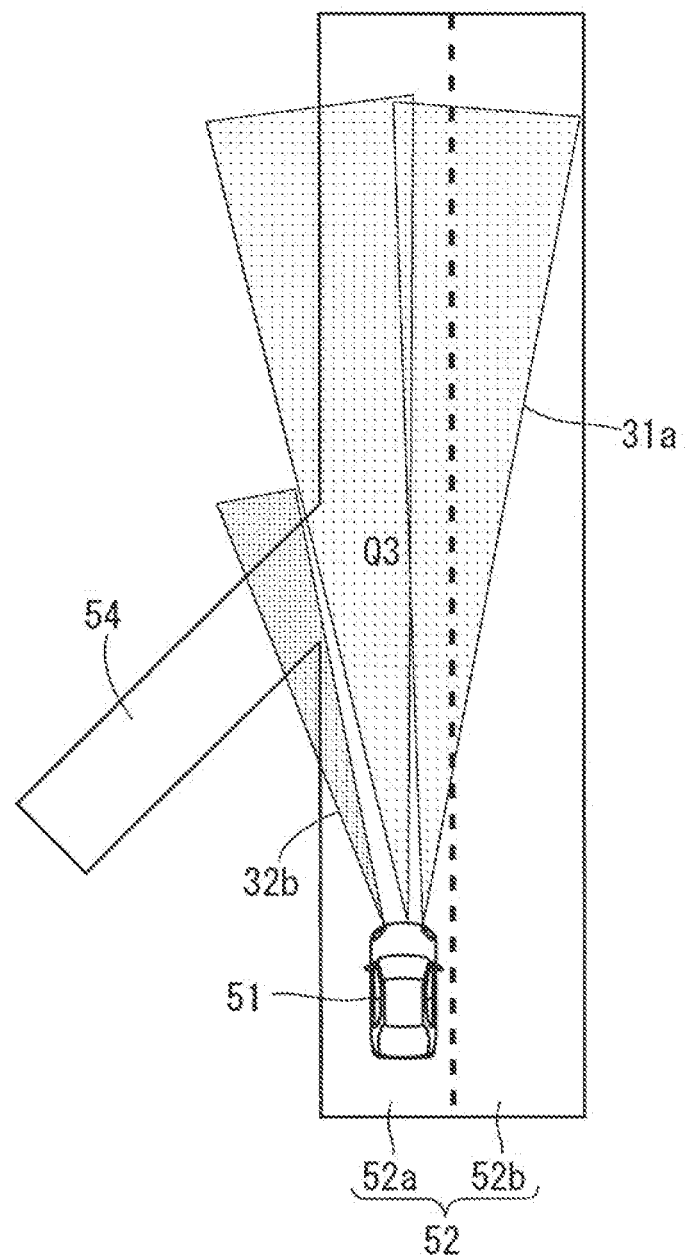
FIG. 19 is a diagram for describing operation of the driving assistance apparatus according to Modification 1 of Embodiment 4.

As a second example, while the illumination range 32a in the first illumination manner for the branching road includes the portion of the branching road slightly farther than the connection port of the branching road as illustrated in FIGS. 4 and 5, an illumination range 32b in the second illumination manner for the merging road may include only a connection port of the merging road 54 as illustrated in FIGS. 18 and 19. As the second illumination manner for the merging road, the sub-lamp 32 may spot illuminate an elliptical range as illustrated in FIG. 18 or may illuminate a range having a normal shape as illustrated in FIG. 19. A merging point Q3 of the merging road 54 into the left lane 52a as the travel lane is illustrated in each of FIGS. 18 and 19.

For example, the first illumination manner for the branching road may include illumination with at least any of characters, graphics, or signs indicating the branching road, and the second illumination manner for the merging road may include illumination with at least any of characters, graphics, or signs indicating the merging road.

Modification 2 of Embodiment 4

While the second illumination section is described to be similar to the first illumination section in Embodiment 4, the first illumination section and the second illumination section may be different from each other. For example, at the merging point, a vehicle traveling in the travel lane can collide with a vehicle traveling on the merging road and tends to change lanes to avoid the merging road. In view of the foregoing, the second illumination section may be longer than the first illumination section.

Modification 3 of Embodiment 4

While description has been made based on the assumption that the illumination controller 12a causes the sub-lamp 32 to continuously illuminate the merging road in the second illumination manner in Embodiment 4, the illumination controller 12a may cause the sub-lamp 32 to intermittently illuminate the merging road when the distance between the merging point and the vehicle is less than or equal to a threshold. The illumination controller 12a may increase or decrease the size of the illumination range 32b of the sub-lamp 32 in the second illumination manner as appropriate.

Modification 4 of Embodiment 4

The driving assistance apparatus 1 may include an unillustrated moving body detection unit included in the concept of the acquisition unit 11 similarly to the road information acquisition unit 11a and the vehicle position acquisition unit 11b in FIG. 2. The moving body detection unit is various types of radar, for example, and is configured to be capable of detecting a moving body, such as a vehicle, moving from the merging road to the merging point.

The illumination controller 12a may control the second illumination manner based on whether the moving body has been detected by the moving body detection unit. For example, the illumination controller 12a may make the illumination range of the sub-lamp 32 when the moving body has been detected more prominent than the illumination range of the sub-lamp 32 when the moving body has not been detected, for example, by increasing the illumination range of the sub-lamp 32 when the moving body has been detected. For example, the illumination controller 12a may cause the sub-lamp 32 to illuminate the merging road in the second illumination manner when the moving body has been detected and may cause the sub-lamp 32 to stop illumination in the second illumination manner when the moving body has not been detected. According to such a configuration, the driver can be alerted to pay attention to the moving body, and unnecessary illumination by the sub-lamp 32 can be suppressed.

Modification 5 of Embodiment 4

In Modification 4 of Embodiment 4, the illumination controller 12a may control the second illumination manner based on a type of the moving body having been detected by the moving body detection unit. For example, the illumination controller 12a may cause the sub-lamp 32 to stop illumination in the second illumination manner when the moving body is a vehicle that performs illumination by the headlamp and may cause the sub-lamp 32 to illuminate the merging road in the second illumination manner when the moving body is not the vehicle that performs illumination by the headlamp. When the moving body is a pedestrian or a bicycle, the illumination controller 12a may make the illumination range of the sub-lamp 32 prominent, for example, by increasing the illumination range of the sub-lamp 32. In this case, the merging road may be a sidewalk at an intersection or a bicycle road.

Modification 6 of Embodiment 4

The illumination controller 12a may read a type of the merging road from the road information and may control the second illumination manner based on the type of the merging road. For example, when the width of the merging road is less than or equal to a threshold, a pedestrian or a bicycle is relatively likely to run out from the merging road, so that the illumination controller 12a may make the illumination range of the sub-lamp 32 prominent, for example, by increasing the illumination range of the sub-lamp 32 with decreasing width of the merging road. For example, when the merging road is a vehicle road, a pedestrian or a bicycle is relatively unlikely to run out from the merging road, so that the illumination controller 12a may make the illumination range of the sub-lamp 32 not excessively prominent, for example, by decreasing the illumination range of the sub-lamp 32.

Embodiment 5

A block diagram of a driving assistance apparatus 1 according to Embodiment 5 is similar to the block diagram of the driving assistance apparatus 1 according to Embodiment 2 (see FIG. 2). From among components according to Embodiment 5, the same components as or similar components to the above-mentioned components bear the same reference signs as or similar reference signs to those of the same or similar components, and different components will mainly be described below.

The illumination controller 12a according to Embodiment 5 performs, on a branching road indirectly connected to the travel lane, processing similar to processing performed on the branching road directly connected to the travel lane. The branching road directly connected to the travel lane is hereinafter also referred to as a "direct branching road", and the branching road indirectly connected to the travel lane is hereinafter also referred to as an "indirect branching road".

The illumination controller 12a determines, based on the position information, the travel lane information, and the road information, whether there is the indirect branching road and whether the vehicle is traveling a third illumination section.

Figure 20:
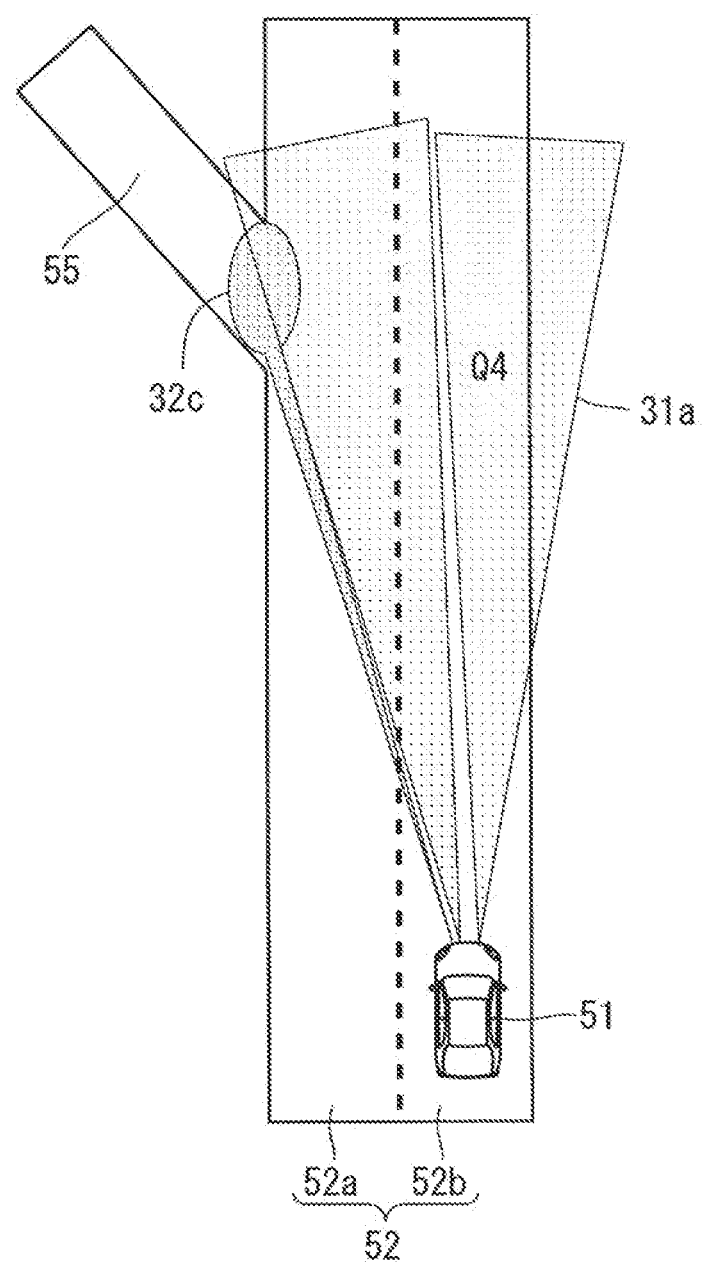
FIG. 20 is a diagram for describing operation of a driving assistance apparatus according to Embodiment 5.

The third illumination section is a section satisfying a predetermined positional relationship with an indirect branching point of the indirect branching road from the travel lane. An indirect branching point Q4 is a point in the travel lane (the right lane 52b in FIG. 20) where there is a connection port of an indirect branching road 55 in a direction of the width of the travel lane as illustrated in FIG. 20. In Embodiment 5, the third illumination section is similar to the first illumination section and is a section of the travel lane between the indirect branching point Q4 and a point a predetermined distance (e.g., 100 m) away from the indirect branching point toward the vehicle, for example.

When it is determined, as a result of determination described above, that there is the indirect branching road and the vehicle is traveling the third illumination section, the illumination controller 12a performs control to cause the sub-lamp 32 to illuminate the indirect branching road in a third illumination manner different from the first illumination manner. For example, while the illumination range 32a in the first illumination manner for the branching road 53 includes the portion of the branching road 53 slightly farther than the connection port of the branching road 53 as illustrated in FIG. 4, an illumination range 32c in the third illumination manner for the indirect branching road 55 includes only a portion of the indirect branching road 55 close to the connection port of the indirect branching road 55 as illustrated in FIG. 20. As the third illumination manner for the indirect branching road 55, the sub-lamp 32 may spot illuminate an elliptical range as illustrated in FIG. 20 or may perform illumination in other ways.

The first illumination manner for the direct branching road and the third illumination manner for the indirect branching road may differ in color tone or illuminance. The first illumination manner may include illumination with at least any of characters, graphics, or signs indicating the direct branching road, and the third illumination manner may include illumination with at least any of different characters, graphics, or signs indicating the indirect branching road.

Operation

Figure 21:
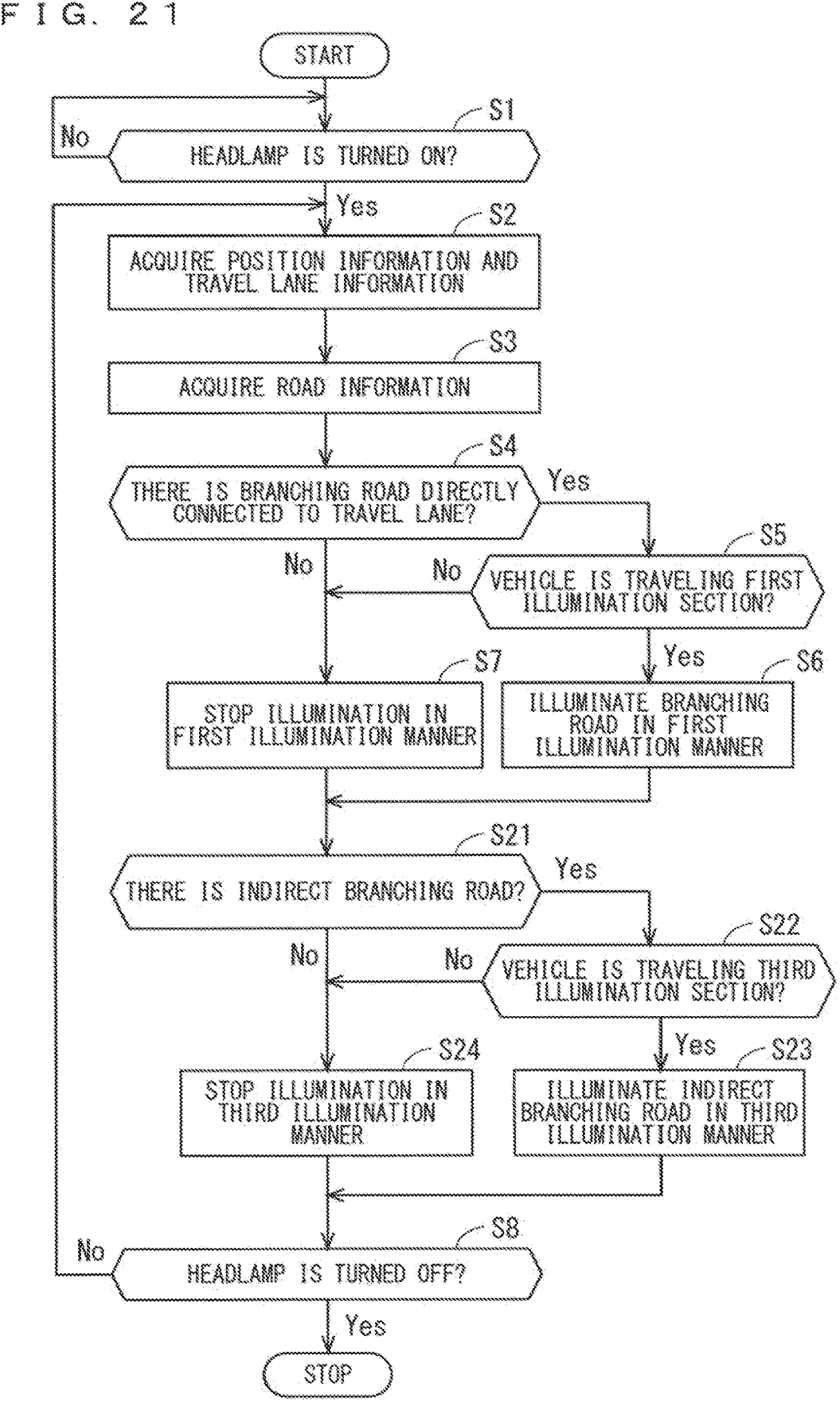
FIG. 21 is a flowchart showing operation of the driving assistance apparatus according to Embodiment 5.

FIG. 21 is a flowchart showing operation of the driving assistance apparatus 1 according to Embodiment 5. Operation in FIG. 21 is performed anytime during travel of the vehicle.

First, in steps S1 to S7, operation similar to that in steps S1 to S7 in FIG. 3 is performed. After step S6 or S7, processing in step S21 is performed.

In step S21, the illumination controller 12a determines whether there is the indirect branching road. Processing proceeds to step S22 when it is determined that there is the indirect branching road and proceeds to step S24 when it is not determined that there is the indirect branching road.

In step S22, the illumination controller 12a determines whether the vehicle is traveling the third illumination section based on the indirect branching road determined in step S21 and the position information. Processing proceeds to step S23 when it is determined that the vehicle is traveling the third illumination section and proceeds to step S24 when it is not determined that the vehicle is traveling the third illumination section.

In step S23, the illumination controller 12a performs control to turn on the sub-lamp 32 and cause the sub-lamp 32 to illuminate the indirect branching road in the third illumination manner. Illumination by the headlamp 31 is maintained unless the driver performs operation to turn off the headlamp 31 and the like. Processing then proceeds to step S8.

In step S24, when the sub-lamp 32 performs illumination in the third illumination manner, the illumination controller 12a causes the sub-lamp 32 to stop the illumination. Illumination by the headlamp 31 is maintained unless the driver performs operation to turn off the headlamp 31 and the like. Processing then proceeds to step S8.

In step S8, the illumination controller 12a determines whether the headlamp 31 is turned off. Operation in FIG. 21 ends when it is determined that the headlamp 31 is turned off, and processing returns to step S2 when it is not determined that the headlamp 31 is turned off.

When the travel lane is directly connected to neither the direct branching road nor the indirect branching road as a result of the above-mentioned operation, the sub-lamp 32 does not perform illumination, and only the headlamp 31 performs illumination in principle. When there are both the direct branching road and the indirect branching road, the illumination controller 12a may cause the sub-lamp 32 to simultaneously illuminate the direct branching road and the indirect branching road. When the sub-lamp 32 does not have a function of simultaneously illuminating the direct branching road and the indirect branching road, the sub-lamp 32 may sequentially illuminate the direct branching road and the indirect branching road from the one closer to the vehicle or may preferentially illuminate the direct branching road.

Summary of Embodiment 5

According to the driving assistance apparatus 1 according to Embodiment 5 as described above, control to cause the sub-lamp 32 to illuminate the indirect branching road in the third illumination manner different from the first illumination manner is performed when it is determined that there is the indirect branching road and the vehicle is traveling the third illumination section. According to such a configuration, control to cause the sub-lamp 32 to illuminate the indirect branching road can be performed in a section in which the vehicle is an appropriate distance away from the indirect branching point, so that the sub-lamp 32 can appropriately be controlled.

Modification 1 of Embodiment 5

While a case where the road includes two lanes has been shown in Embodiment 5, the road may include three or more lanes, and the illumination controller 12a may control the third illumination manner for the indirect branching road based on which one of the three or more lanes is the travel lane. For example, the illumination range in the third illumination manner may be made less prominent as the number of other lanes between the indirect branching road and the travel lane increases, and illumination by the sub-lamp 32 in the third illumination manner may be stopped when the number of other lanes is equal to or more than a threshold.

Modification 2 of Embodiment 5

While description has been made based on the assumption that the illumination controller 12a causes the sub-lamp 32 to continuously illuminate the indirect branching road in the third illumination manner in Embodiment 5, illumination by the sub-lamp 32 is not limited to this illumination. For example, the illumination controller 12a may cause the sub-lamp 32 to intermittently illuminate the indirect branching road when a distance between the indirect branching point and the vehicle is less than or equal to a threshold. The illumination controller 12a may increase or decrease the size of the illumination range 32c of the sub-lamp 32 in the third illumination manner as appropriate. The third illumination manner for the indirect branching road may include illumination with at least any of characters, graphics, or signs indicating the indirect branching road.

Modification 3 of Embodiment 5

While the third illumination section is described to be similar to the first illumination section in Embodiment 5, the first illumination section and the third illumination section may be different from each other. In view of time required for the vehicle to change lanes to travel toward the indirect branching road, the third illumination section may be longer than the first illumination section.

Modification 4 of Embodiment 5

Figure 22:
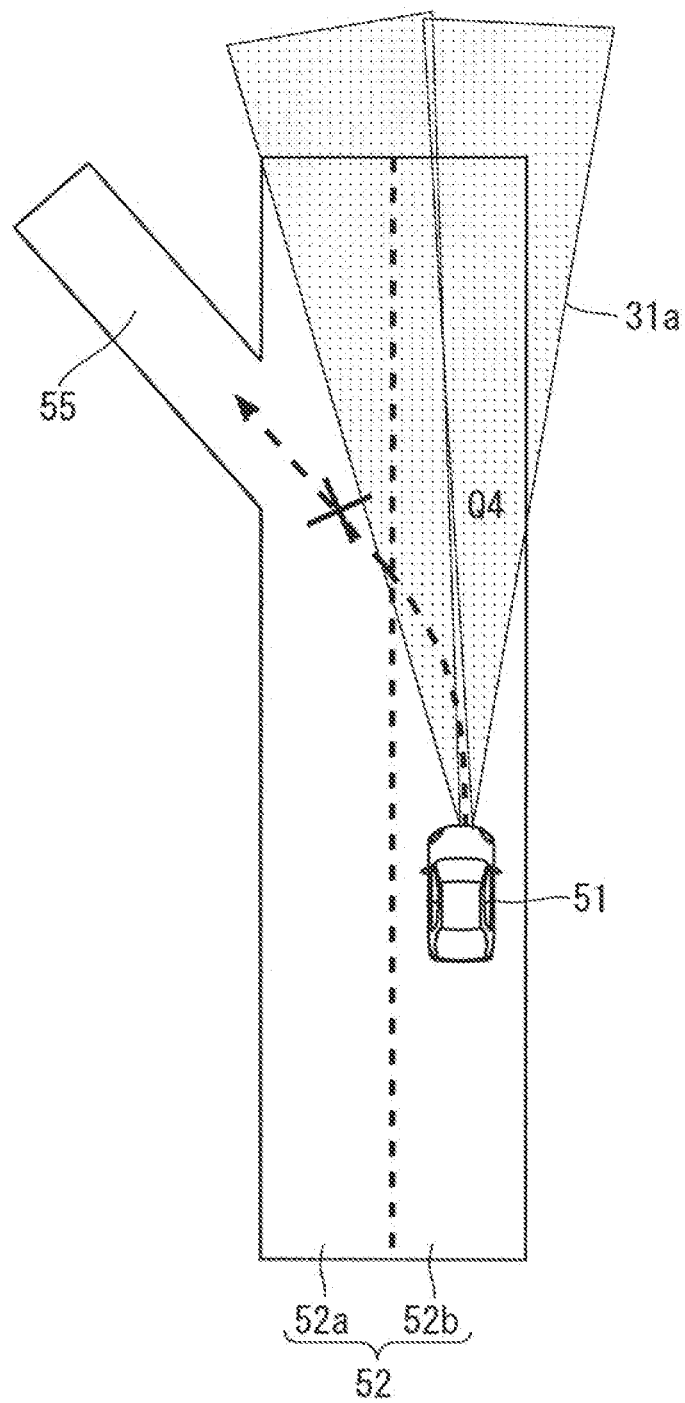
FIG. 22 is a diagram for describing operation of a driving assistance apparatus according to Modification 4 of Embodiment 5.

The illumination controller 12a may determine whether the vehicle can enter the indirect branching road based on the road information and the position information of the vehicle and may control the third illumination manner based on a result of determination. For example, when the vehicle is located at a point where the vehicle cannot enter the indirect branching road even if changing lanes, the illumination controller 12a may cause the sub-lamp 32 to stop illumination in the third illumination manner. Specifically, the vehicle is required to give a turn signal three seconds before a lane change, so that the illumination controller 12a may cause the sub-lamp 32 to stop illumination in the third illumination manner when the vehicle 51 arrives at a point where the vehicle 51 will arrive at the indirect branching point Q4 three seconds after the arrival as illustrated in FIG. 22.

Modification 5 of Embodiment 5

In Embodiment 5, the illumination controller 12a may determine whether the vehicle is prohibited from entering the indirect branching road by law and the like based on the road information and the position information of the vehicle and may control the third illumination manner based on a result of determination.

Assume that the travel lane in which the vehicle is traveling is the right lane, and there is the branching road directly connected to the left lane, for example. The branching road directly connected to the left lane is the indirect branching road for the right lane, so that the sub-lamp 32 illuminates the indirect branching road in the third illumination manner in principle. When lane changes from the right lane to the left lane are prohibited by law, however, the illumination controller 12a may cause the sub-lamp 32 to stop illumination of the indirect branching road in the third illumination manner.

Modification 6 of Embodiment 5

In Embodiment 5, the driving assistance apparatus 1 may include the path information acquisition unit that acquires the travel path information indicating the path along which the vehicle is to travel as in Modification 6 of Embodiment 2. The illumination controller 12a may control the third illumination manner of the sub-lamp 32 based on whether the path indicated by the travel path information acquired by the path information acquisition unit enters the indirect branching road. For example, the illumination range of the sub-lamp 32 when the vehicle is to enter the indirect branching road may be made larger and more prominent than the illumination range of the sub-lamp 32 when the vehicle is not to enter the indirect branching road.

Modification 7 of Embodiment 5

Illumination of the branching road in the first illumination manner in Embodiment 2, illumination of the merging road in the second illumination manner in Embodiment 4, and illumination of the indirect branching road in the third illumination manner in Embodiment 5 may be combined with each other.

Figure 23:
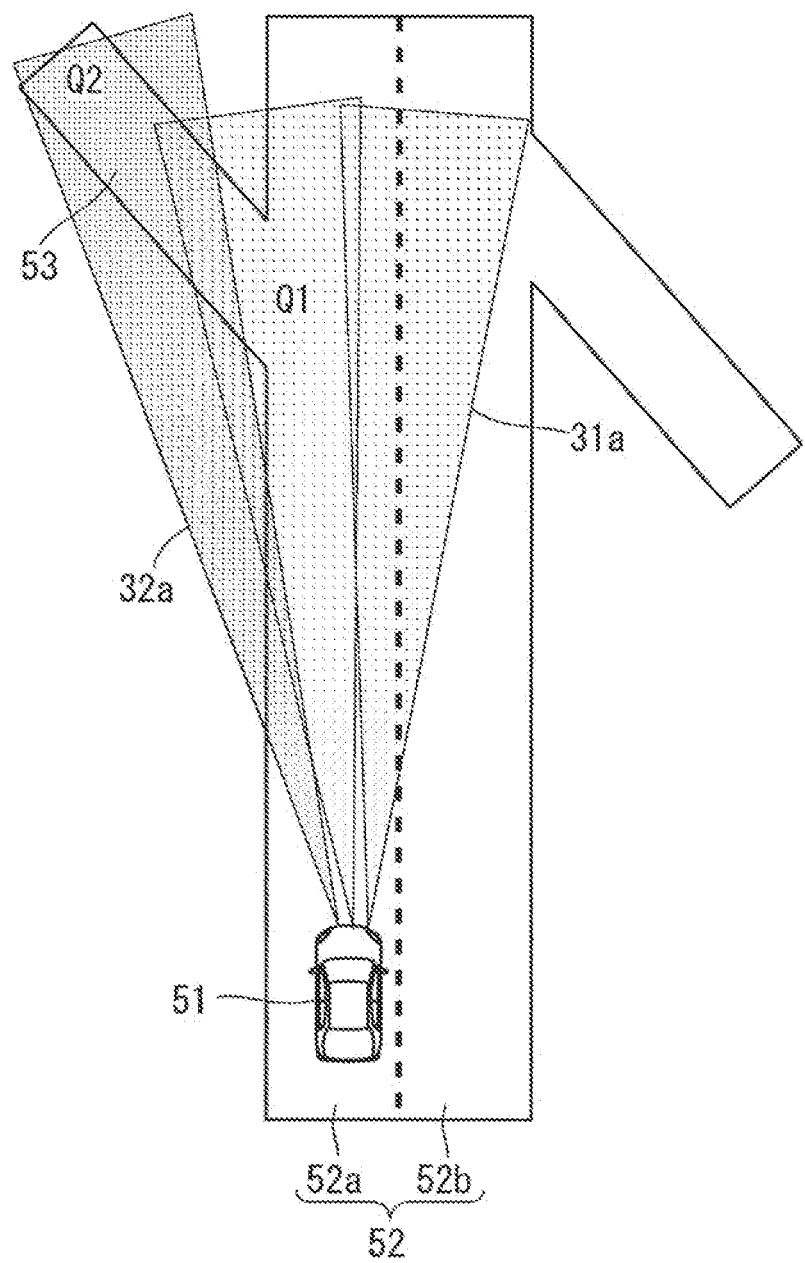
FIG. 23 is a diagram for describing operation of a driving assistance apparatus according to Modification 7 of Embodiment 5.
Figure 24:
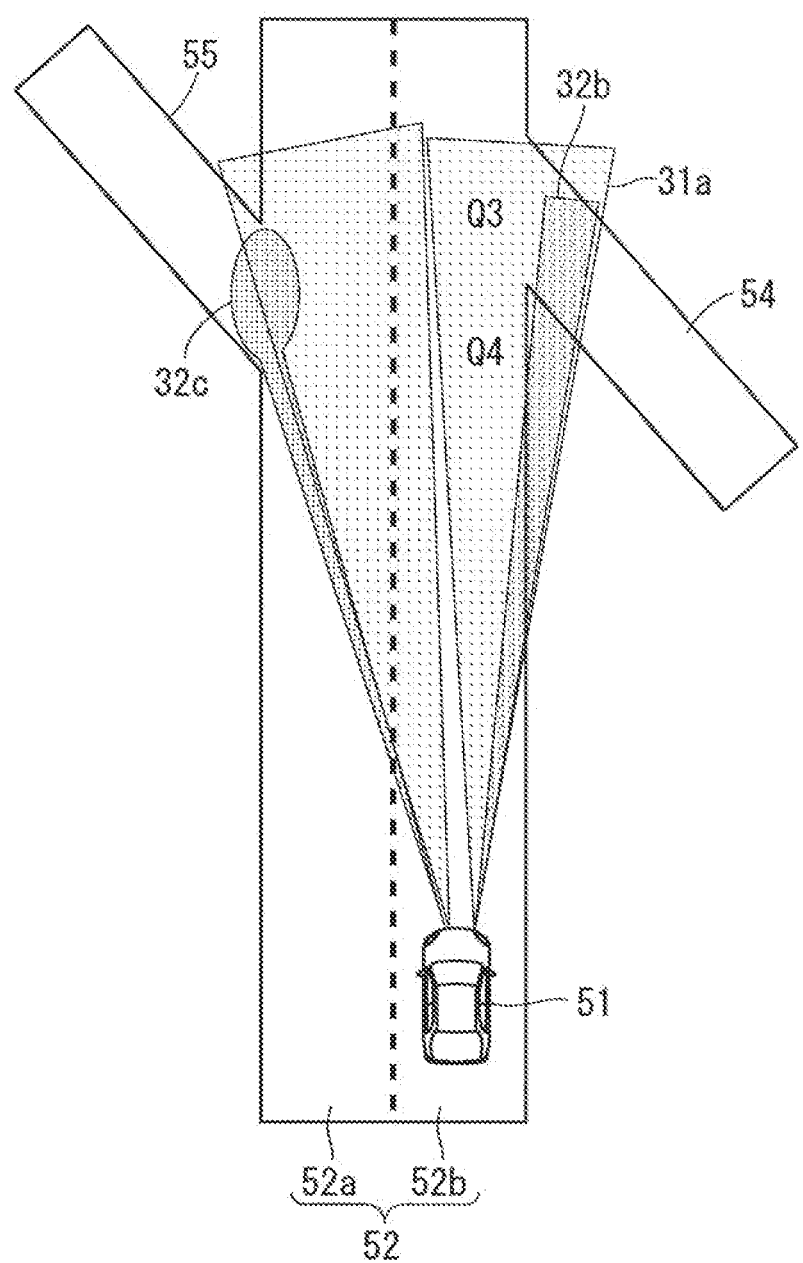
FIG. 24 is a diagram for describing operation of the driving assistance apparatus according to Modification 7 of Embodiment 5.

In an example of FIG. 23, there is the branching road 53 directly connected to the left lane 52a as the travel lane. In such a case, illumination of the branching road 53 in the first illumination manner is performed. In an example of FIG. 24, there are the merging road 54 directly connected to the right lane 52b as the travel lane and the indirect branching road 55 indirectly connected to the right lane 52b. In such a case, illumination of the merging road 54 in the second illumination manner and illumination of the indirect branching road 55 in the third illumination manner may be performed in parallel.

Modification 8 of Embodiment 5

The illumination controller 12a may perform, on an indirect merging road being a merging road indirectly connected to the travel lane, processing similar to processing performed on the indirect branching road. That is to say, the illumination controller 12a may determine, based on the position information, the travel lane information, and the road information, whether there is the indirect merging road and whether the vehicle is traveling a fourth illumination section satisfying a predetermined positional relationship with an indirect merging point of the indirect merging road into the travel lane.

Figure 25:
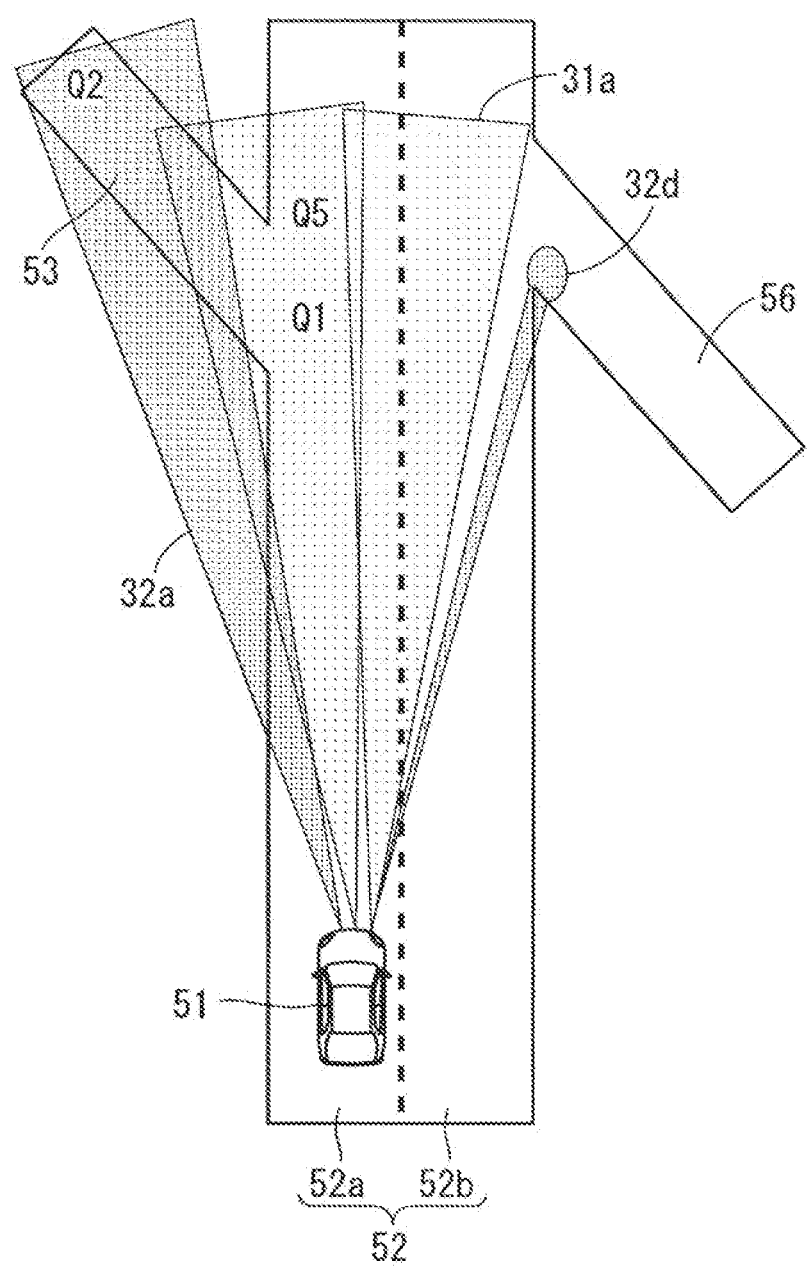
FIG. 25 is a diagram for describing operation of a driving assistance apparatus according to Modification 8 of Embodiment 5.

As illustrated in FIG. 25, an indirect merging point Q5 is a point in the travel lane (the left lane 52a in FIG. 25) where there is a connection port of an indirect merging road 56 in a direction of the width of the travel lane. The fourth illumination section may be or may not be similar to any of the first illumination section, the second illumination section, and the third illumination section.

When it is determined that there is the indirect merging road and the vehicle is traveling the fourth illumination section, the illumination controller 12a may perform control to cause the sub-lamp 32 to illuminate the indirect merging road in a fourth illumination manner different from the first to third illumination manners.

Illumination of the branching road in the first illumination manner in Embodiment 2, illumination of the merging road in the second illumination manner in Embodiment 4, illumination of the indirect branching road in the third illumination manner in Embodiment 5, and illumination of the indirect merging road in the fourth illumination manner in Modification 8 may be combined with each other.

In the example of FIG. 25, there are the branching road 53 directly connected to the left lane 52a as the travel lane and the indirect merging road 56 indirectly connected to the left lane 52a. In such a case, illumination of the branching road 53 in the first illumination manner and illumination of the indirect merging road 56 in the fourth illumination manner may be performed in parallel. As illustrated in FIG. 25, an illumination range 32d in the fourth illumination manner for the indirect merging road may be made less prominent than the illumination range 32a in the first illumination manner for the direct branching road.

Modifications similar to modifications made to the direct merging road or the indirect branching road may be made to the indirect merging road.

For example, a modification similar to Modification 4 of Embodiment 4 (i.e., a modification to the direct merging road) may be made to the indirect merging road. Specifically, the moving body detection unit may be capable of detecting the moving body moving from the indirect merging road to the indirect merging point, and the illumination controller 12a may control the fourth illumination manner based on whether the moving body moving from the indirect merging road to the indirect merging point has been detected by the moving body detection unit. More specifically, the illumination controller 12a may cause the sub-lamp 32 to illuminate the indirect merging road in the fourth illumination manner when the moving body has been detected and may cause the sub-lamp 32 to stop illumination in the fourth illumination manner when the moving body has not been detected.

For example, a modification similar to Modification 5 of Embodiment 5 (i.e., a modification to the indirect branching road) may be made to the indirect merging road. Specifically, the illumination controller 12a may determine whether the vehicle is prohibited from entering the indirect merging road by law and the like based on the road information and the position information of the vehicle and may control the fourth illumination manner based on a result of determination.

Figure 26:
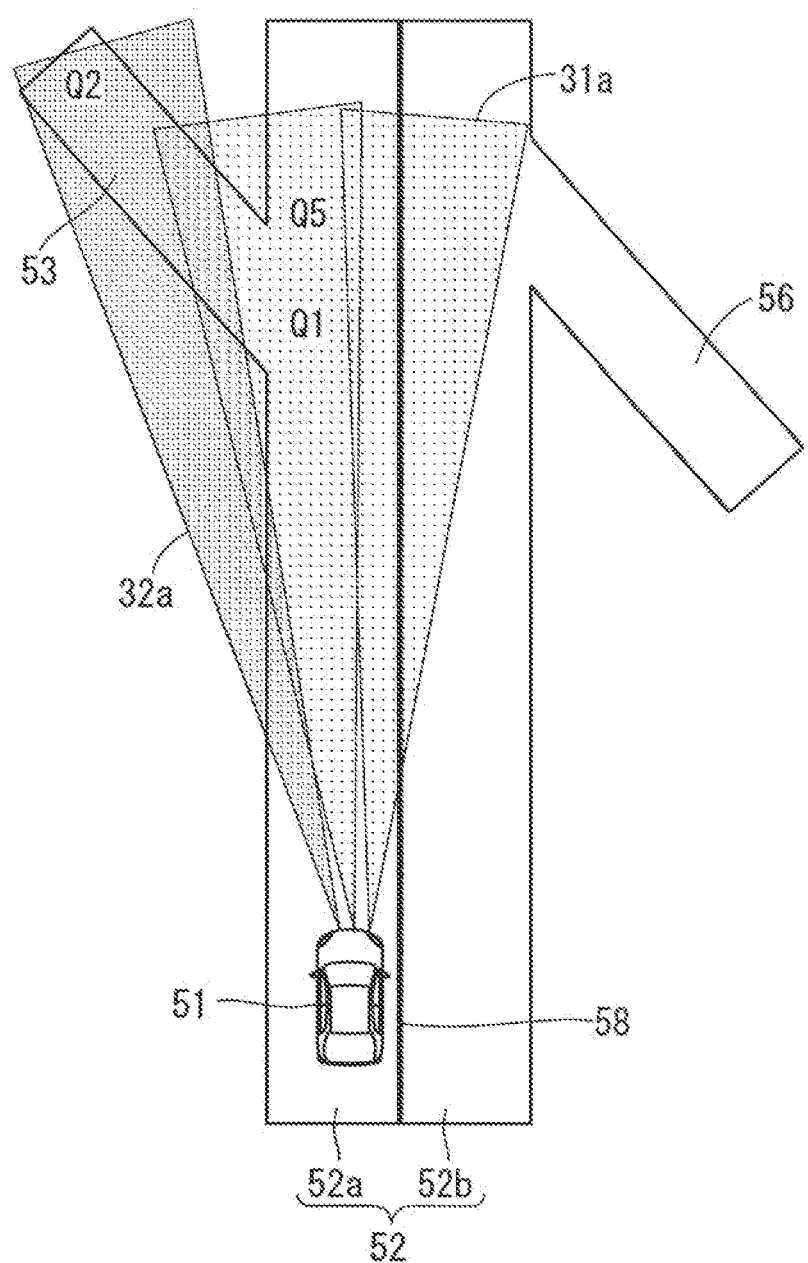
FIG. 26 is a diagram for describing operation of the driving assistance apparatus according to Modification 8 of Embodiment 5.

Assume that the travel lane in which the vehicle 51 is traveling is the left lane 52a, and there is the merging road directly connected to the right lane 52b as illustrated in FIG. 26, for example. The merging road directly connected to the right lane 52b is the indirect merging road 56 for the left lane 52a, so that the sub-lamp 32 illuminates the indirect merging road 56 in the fourth illumination manner in principle. When there is a center line 58 to prohibit lane changes by law between the left lane 52a and the right lane 52b as illustrated in FIG. 26, however, the illumination controller 12a may cause the sub-lamp 32 to stop illumination of the indirect merging road 56 in the fourth illumination manner.

Other Modifications

Figure 27:
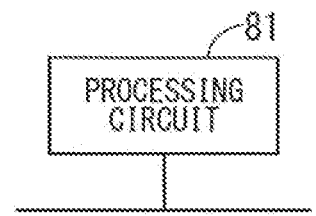
FIG. 27 is a block diagram showing a hardware configuration of a driving assistance apparatus according to another modification.

The acquisition unit 11 and the controller 12 in FIG. 1 described above are hereinafter referred to as "the acquisition unit 11 and the like". The acquisition unit 11 and the like are achieved by a processing circuit 81 shown in FIG. 27. That is to say, the processing circuit 81 includes: the acquisition unit 11 that acquires the position information of the vehicle, the travel lane information indicating the travel lane in which the vehicle is traveling, and the road information; and the controller 12 that performs control to cause the lighting apparatus to illuminate the branching road directly connected to the travel lane in the first illumination manner when it is determined, based on the position information, the travel lane information, and the road information, that there is the branching road and the vehicle is traveling the first illumination section satisfying the predetermined positional relationship with the branching point of the branching road from the travel lane. Dedicated hardware may be applied, or a processor to execute a program stored in memory may be applied to the processing circuit 81. The processor corresponds to a central processing unit, a processing unit, an arithmetic unit, a microprocessor, a microcomputer, a digital signal processor (DSP), and the like, for example.

When the processing circuit 81 is the dedicated hardware, the processing circuit 81 corresponds to a single circuit, a composite circuit, a programmed processor, a parallel programmed processor, an application specific integrated circuit (ASIC), a field programmable gate array (FPGA), and a combination thereof, for example. The functions of the components such as the acquisition unit 11 and the like may be achieved by distributed processing circuits or may collectively be achieved by a single processing circuit.

Figure 28:
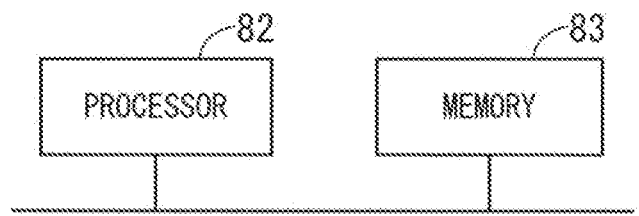
FIG. 28 is a block diagram showing a hardware configuration of a driving assistance apparatus according to another modification.

When the processing circuit 81 is the processor, the functions of the acquisition unit 11 and the like are achieved by combination with software and the like. The software and the like correspond to software, firmware, or software and firmware, for example. The software and the like are described as the program and stored in the memory. As shown in FIG. 28, a processor 82 applied to the processing circuit 81 reads and executes the program stored in memory 83 to achieve the functions of the components. That is to say, the driving assistance apparatus 1 includes the memory 83 to store the program which, when executed by the processing circuit 81, results in performance of steps including: acquiring the position information of the vehicle, the travel lane information indicating the travel lane in which the vehicle is traveling, and the road information; and performing control to cause the lighting apparatus to illuminate the branching road directly connected to the travel lane in the first illumination manner when it is determined, based on the position information, the travel lane information, and the road information, that there is the branching road and the vehicle is traveling the first illumination section satisfying the predetermined positional relationship with the branching point of the branching road from the travel lane. In other words, it can be said that the program causes a computer to execute procedures or methods of the acquisition unit 11 and the like. The memory 83 herein may be, for example, nonvolatile or volatile semiconductor memory, such as random access memory (RAM), read only memory (ROM), flash memory, erasable programmable read only memory (EPROM), and electrically erasable programmable read only memory (EEPROM), a hard disk drive (HDD), a magnetic disk, a flexible disk, an optical disc, a compact disc, a mini disc, a digital versatile disc (DVD), a drive device thereof, and the like or any storage medium to be used in the future.

A configuration in which the functions of the acquisition unit 11 and the like are achieved by the hardware or by the software and the like has been described above. The configuration, however, is not limited to this configuration, and one or more of the acquisition unit 11 and the like may be achieved by the dedicated hardware, and the other one or more of the acquisition unit 11 and the like may be achieved by the software and the like. For example, the function of the acquisition unit 11 can be achieved by the processing circuit 81 as the dedicated hardware, an interface, a receiver, and the like, and the functions of the other components can be achieved by the processing circuit 81 as the processor 82 reading and executing the program stored in the memory 83.

As described above, the processing circuit 81 can achieve the above-mentioned functions by hardware, software and the like, or a combination thereof.

The driving assistance apparatus described above is applicable to a driving assistance system configured as a system by combining various vehicle apparatuses, a communication terminal including a mobile terminal, such as a mobile phone, a smartphone, and a tablet, a function of an application installed on at least one of the vehicle apparatuses or the communication terminal, and a server as appropriate. In this case, the functions or the components of the driving assistance apparatus described above may be distributed among instruments constituting the system or may be concentrated on any of the instruments.

Figure 29:
FIG. 29 is a block diagram showing a configuration of a server according to another modification.

FIG. 29 is a block diagram showing a configuration of a server 91 according to a modification. The server 91 in FIG. 29 includes a communication unit 91a and a controller 91b and can wirelessly communicate with a vehicle apparatus 93 of a vehicle 92.

The communication unit 91a as the acquisition unit wirelessly communicates with the vehicle apparatus 93 to receive the position information of the vehicle, the travel lane information, and the road information acquired by the vehicle apparatus 93.

The controller 91b has similar functions to the controller 12 in FIG. 1 by an unillustrated processor and the like of the server 91 executing a program stored in unillustrated memory of the server 91. That is to say, the controller 91b generates a control signal to perform control to cause the lighting apparatus 3 to illuminate the branching road directly connected to the travel lane in the first illumination manner when it is determined, based on the position information, the travel lane information, and the road information, that there is the branching road and the vehicle is traveling the first illumination section. The communication unit 91a transmits the control signal generated by the controller 91b to the vehicle apparatus 93. According to the server 91 having such a configuration, a similar effect to that obtained by the driving assistance apparatus 1 described in Embodiment 1 can be obtained.

Figure 30:
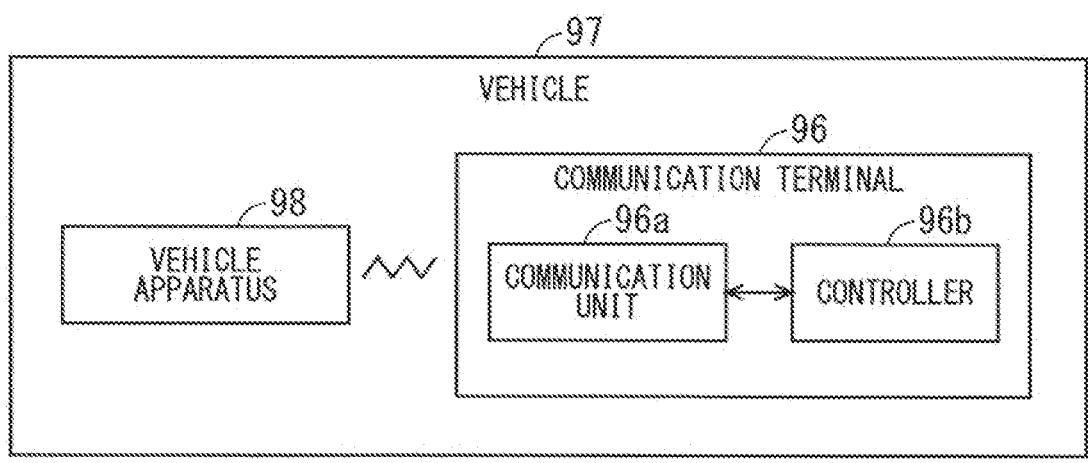
FIG. 30 is a block diagram showing a configuration of a communication terminal according to another modification.

FIG. 30 is a block diagram showing a configuration of a communication terminal 96 according to a modification. The communication terminal 96 in FIG. 30 includes a communication unit 96a similar to the communication unit 91a and a controller 96b similar to the controller 91b and can wirelessly communicate with a vehicle apparatus 98 of a vehicle 97. A mobile terminal, such as a mobile phone, a smartphone, and a tablet, carried by a driver of the vehicle 97 is applied to the communication terminal 96, for example. According to the communication terminal 96 having such a configuration, a similar effect to that obtained by the driving assistance apparatus 1 described in Embodiment 1 can be obtained.

Embodiments and modifications can freely be combined with each other and can be modified or omitted as appropriate.

The foregoing description is in all aspects illustrative and not restrictive. It is understood that numerous unillustrated modifications can be devised.

EXPLANATION OF REFERENCE SIGNS

1 driving assistance apparatus, 2 high-precision locator apparatus, 3 lighting apparatus, 7 image processing apparatus, 11 acquisition unit, 12 controller, 21 high-precision map database, 22 high-precision positioning unit, 31 headlamp, 32 sub-lamp, 51 vehicle, 53 branching road, 54 merging road, 55 indirect branching road, 61 normal-precision map database, Q1 branching point, Q3 merging point, Q4 indirect branching point.

The invention claimed is:

1. A driving assistance apparatus that controls a lighting apparatus to illuminate a road from a vehicle, the driving assistance apparatus comprising:
   acquisition circuitry that acquires position information of the vehicle, travel lane information indicating a travel lane in which the vehicle is traveling, and road information;
   a controller that performs control to cause the lighting apparatus to illuminate a branching road in a first illumination manner when it is determined, based on the position information, the travel lane information, and the road information, that the travel lane in which the vehicle is traveling is a lane of a road with a plurality of lanes per direction and is directly connected to the branching road and the vehicle is traveling a first illumination section satisfying a predetermined positional relationship with a branching point of the branching road from the travel lane; and
   the controller causes the lighting apparatus to illuminate the branching road in the first illumination manner when the travel lane is the lane directly connected to the branching road and does not cause the lighting apparatus to illuminate the branching road in the first illumination manner when the travel lane is not the lane directly connected to the branching road.

2. The driving assistance apparatus according to claim 1, wherein
   the acquisition circuitry acquires the road information from a high-precision map database of a high-precision locator apparatus and acquires the position information and the travel lane information from high-precision positioning circuitry of the high-precision locator apparatus, the high-precision map database storing the road information for each lane, the high-precision positioning circuitry detecting the position information and the travel lane information.

3. The driving assistance apparatus according to claim 1, wherein
   the acquisition circuitry acquires the road information, the position information, and the travel lane information from an image processing apparatus recognizing the road information, the position information, and the travel lane information based on an image of surroundings of the vehicle.

4. The driving assistance apparatus according to claim 1, wherein
   the controller causes the lighting apparatus to illuminate a range of the branching road including a point a predetermined distance away from the branching point.

5. The driving assistance apparatus according to claim 1, wherein
   the lighting apparatus includes a headlamp and a sub-lamp, and
   the controller controls an illumination manner of the headlamp based on a planar shape of the travel lane and controls the first illumination manner of the sub-lamp based on a planar shape of the branching road.

6. The driving assistance apparatus according to claim 1, wherein
   the controller controls the first illumination manner based on a difference in grade between the travel lane and the branching road.

7. The driving assistance apparatus according to claim 1, wherein
   the acquisition circuitry further acquires travel path information indicating a path along which the vehicle is to travel, and
   the controller controls the first illumination manner based on whether the path indicated by the travel path information enters the branching road.

8. The driving assistance apparatus according to claim 1, wherein
   the controller performs control to cause the lighting apparatus to illuminate a merging road directly connected to the travel lane in a second illumination manner when it is determined, based on the position information, the travel lane information, and the road information, that there is the merging road and the vehicle is traveling a second illumination section satisfying a predetermined positional relationship with a merging point of the merging road into the travel lane.

9. The driving assistance apparatus according to claim 8, wherein
   the first illumination section and the second illumination section are different from each other.

10. The driving assistance apparatus according to claim 8, wherein
    the acquisition circuitry is capable of detecting a moving body moving from the merging road to the merging point, and
    the controller controls the second illumination manner based on whether the moving body has been detected by the acquisition circuitry.

11. The driving assistance apparatus according to claim 8, wherein
    the controller performs, based on a type of the merging road, control so that the second illumination manner is more prominent when a possibility that a pedestrian or a bicycle runs out from the merging road is high than when the possibility is low.

12. The driving assistance apparatus according to claim 1, wherein
    the controller performs control to cause the lighting apparatus to illuminate an indirect branching road being a branching road indirectly connected to the travel lane in a third illumination manner different from the first illumination manner when it is determined, based on the position information, the travel lane information, and the road information, that there is the indirect branching road and the vehicle is traveling a third illumination section satisfying a predetermined positional relationship with an indirect branching point of the indirect branching road from the travel lane.

13. The driving assistance apparatus according to claim 12, wherein
    the third illumination manner includes illumination with at least any of characters, graphics, or signs.

14. The driving assistance apparatus according to claim 12, wherein
    the first illumination section and the third illumination section are different from each other.

15. The driving assistance apparatus according to claim 12, wherein
    the controller controls the third illumination manner based on whether the vehicle is capable of entering the indirect branching road.

16. The driving assistance apparatus according to claim 12, wherein
the controller controls the third illumination manner based on whether the vehicle is prohibited from entering the indirect branching road.

17. The driving assistance apparatus according to claim 12, wherein
the acquisition circuitry further acquires travel path information indicating a path along which the vehicle is to travel, and
the controller controls the third illumination manner based on whether the path indicated by the travel path information enters the indirect branching road.

18. The driving assistance apparatus according to claim 8, wherein
the controller performs control to cause the lighting apparatus to illuminate an indirect branching road being a branching road indirectly connected to the travel lane in a third illumination manner different from the first illumination manner when it is determined, based on the position information, the travel lane information, and the road information, that there is the indirect branching road and the vehicle is traveling a third illumination section satisfying a predetermined positional relationship with an indirect branching point of the indirect branching road from the travel lane.

19. A driving assistance method of controlling a lighting apparatus to illuminate a road from a vehicle, the driving assistance method comprising:
acquiring position information of the vehicle, travel lane information indicating a travel lane in which the vehicle is traveling, and road information;
performing control to cause the lighting apparatus to illuminate a branching road in a first illumination manner when it is determined, based on the position information, the travel lane information, and the road information, that the travel lane in which the vehicle is traveling is a lane of a road with a plurality of lanes per direction and is directly connected to the branching road and the vehicle is traveling a first illumination section satisfying a predetermined positional relationship with a branching point of the branching road from the travel lane; and
the controller causes the lighting apparatus to illuminate the branching road in the first illumination manner when the travel lane is the lane directly connected to the branching road and does not cause the lighting apparatus to illuminate the branching road in the first illumination manner when the travel lane is not the lane directly connected to the branching road.

* * * * *